(12) United States Patent
Wisniewski

(10) Patent No.: US 12,074,973 B2
(45) Date of Patent: *Aug. 27, 2024

(54) DIGITAL NOTARIZATION USING A BIOMETRIC IDENTIFICATION SERVICE

(71) Applicant: Alclear, LLC, New York, NY (US)

(72) Inventor: Rob Wisniewski, New York, NY (US)

(73) Assignee: SECURE IDENTITY, LLC, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/218,823

(22) Filed: Jul. 6, 2023

(65) Prior Publication Data
US 2023/0362003 A1 Nov. 9, 2023

Related U.S. Application Data

(63) Continuation of application No. 17/485,084, filed on Sep. 24, 2021, now Pat. No. 11,736,291, which is a continuation of application No. 16/587,425, filed on Sep. 30, 2019, now Pat. No. 11,159,321.

(60) Provisional application No. 62/781,912, filed on Dec. 19, 2018.

(51) Int. Cl.
H04L 9/40 (2022.01)
G06F 21/32 (2013.01)
G06Q 20/02 (2012.01)
G06Q 20/38 (2012.01)
H04L 9/32 (2006.01)

(52) U.S. Cl.
CPC ............ *H04L 9/321* (2013.01); *G06F 21/32* (2013.01); *G06Q 20/02* (2013.01); *G06Q 20/389* (2013.01); *H04L 9/3231* (2013.01); *H04L 9/3247* (2013.01); *H04L 63/0861* (2013.01)

(58) Field of Classification Search
CPC .... H04L 9/3231; H04L 9/321; H04L 63/0861
See application file for complete search history.

(56) References Cited

U.S. PATENT DOCUMENTS

| | | | |
|---|---|---|---|
| 8,381,969 | B1 | 2/2013 | Miller et al. |
| 8,423,462 | B1 | 4/2013 | Amacker et al. |
| 8,521,131 | B1 | 8/2013 | Ramalingam et al. |
| 8,700,902 | B2 | 4/2014 | Novack et al. |
| 8,744,966 | B1 | 6/2014 | Amacker et al. |

(Continued)

Primary Examiner — Thaddeus J Plecha
(74) Attorney, Agent, or Firm — Brownstein Hyatt Farber Schreck, LLP

(57) ABSTRACT

A system performs digital notarization using a biometric identification service. A signature requesting service receives a request to validate a digital item with a signature for a person. The signature requesting service provides a payload that identifies the digital item and/or the person to an identity service. The identity service obtains one or more digital representations of biometrics for the person, determines an identity for the person, and returns a data structure including the payload and one or more identity attestations regarding the determined identity. The identity service encrypts at least a portion of the data structure using a private encryption key. A public encryption key for the identity service can then be used to decrypt the portion to verify that the data structure was generated by the identity service after determining the identity. In this way, validation can be verified to the full trust level of the identification service.

20 Claims, 15 Drawing Sheets

(56) References Cited

U.S. PATENT DOCUMENTS

| | | |
|---|---|---|
| 8,965,170 B1 | 2/2015 | Benea |
| 9,107,064 B1 | 8/2015 | Ramalingam et al. |
| 9,166,961 B1 | 10/2015 | Johansson et al. |
| 9,202,105 B1 | 12/2015 | Wang et al. |
| 9,324,098 B1 | 4/2016 | Agrawal et al. |
| 9,386,507 B1 | 7/2016 | Ramalingam et al. |
| 9,596,088 B1 | 3/2017 | Oakes |
| 9,607,138 B1 | 3/2017 | Baldwin et al. |
| 9,609,577 B1 | 3/2017 | Ramalingam et al. |
| 9,681,350 B1 | 6/2017 | Marupaduga et al. |
| 9,681,359 B2 | 6/2017 | Ramalingam et al. |
| 9,686,079 B2 | 6/2017 | Raduchel |
| 9,723,131 B1 | 8/2017 | Ramalingam et al. |
| 9,836,642 B1 | 12/2017 | Ramaswamy |
| 9,934,504 B2 | 4/2018 | Wang et al. |
| 9,967,250 B2 | 5/2018 | Johansson et al. |
| 10,027,662 B1 | 7/2018 | Mutagi et al. |
| 10,055,740 B2 | 8/2018 | Hanson et al. |
| 10,091,003 B2 | 10/2018 | Bhandarkar et al. |
| 10,104,181 B1 | 10/2018 | Rao et al. |
| 10,108,791 B1 | 10/2018 | Masterman |
| 10,108,961 B2 | 10/2018 | Wang et al. |
| 10,122,727 B1 | 11/2018 | Johansson et al. |
| 10,223,696 B2 | 3/2019 | Chen |
| 10,235,669 B2 | 3/2019 | Amacker et al. |
| 10,242,364 B2 | 3/2019 | Wang et al. |
| 10,243,945 B1 | 3/2019 | Kruse et al. |
| 10,430,515 B1 | 10/2019 | Ohme et al. |
| 10,505,741 B1 | 12/2019 | Conley |
| 10,637,646 B2 | 4/2020 | Krishnamacharya |
| 10,671,712 B1 | 6/2020 | Lindley |
| 10,873,457 B1 | 12/2020 | Beaudoin et al. |
| 11,151,481 B1 | 10/2021 | Sun et al. |
| 11,159,321 B2 | 10/2021 | Wisniewski et al. |
| 11,588,638 B2 | 2/2023 | Wisniewski |
| 2004/0221303 A1 | 11/2004 | Sie |
| 2007/0198830 A1 | 8/2007 | Imai |
| 2013/0024919 A1 | 1/2013 | Wetter et al. |
| 2014/0189720 A1 | 7/2014 | Terrazas |
| 2014/0359291 A1 | 12/2014 | Wilson et al. |
| 2015/0026478 A1 | 1/2015 | Raduchel et al. |
| 2015/0294515 A1 | 10/2015 | Bergdale |
| 2015/0310444 A1 | 10/2015 | Chen et al. |
| 2015/0317635 A1 | 11/2015 | Karamchedu |
| 2016/0189063 A1 | 6/2016 | Nie |
| 2017/0188103 A1 | 6/2017 | Pan |
| 2017/0200244 A1 | 7/2017 | Aggarwal et al. |
| 2018/0007060 A1 | 1/2018 | Leblang et al. |
| 2018/0288040 A1 | 10/2018 | Kursun |
| 2019/0036939 A1 | 1/2019 | Johansson et al. |
| 2019/0050631 A1 | 2/2019 | Hayase |
| 2020/0059461 A1 | 2/2020 | Varanasi |
| 2020/0084026 A1* | 3/2020 | Reading ............... H04L 9/3247 |
| 2020/0258176 A1 | 8/2020 | Gibson et al. |
| 2021/0105265 A1* | 4/2021 | Yang ................... H04W 12/047 |

* cited by examiner

840 attestation request:
{
Signature Requesting Service public cert:<verifiable public certificate for Signature Requesting Service>,
sign-and-key:(<AES key X>)$_{PK\text{- Signature Requesting Service}}$
payload(document identifier, name, metadata)$_{AES\text{-}X}$
}

Identity Service notarization:
{
Identification Service public cert:<verifiable public certificate for Identification Service>,
sign-and-key:(<AES key Y>)$_{PK\text{- Identification Service}}$
message(attestation identifier (Identification Service generated), identification
       information<configurable>, hash of binary attestation request payload) $_{AES\text{-}Y}$
request:<unchanged copy of attestation request>
metadata<hash algorithm information, timestamps, etc.>
}

FIG. 9

DIGITAL NOTARIZATION USING A BIOMETRIC IDENTIFICATION SERVICE

CROSS-REFERENCE TO RELATED APPLICATION(S)

This application is a continuation patent application of U.S. patent application Ser. No. 17/485,084, filed Sep. 24, 2021 and titled "Digital Notarization Using a Biometric Identification Service," which is a continuation patent application of U.S. patent application Ser. No. 16/587,425, filed Sep. 30, 2019 and titled "Digital Notarization Using a Biometric Identification Service," now U.S. Pat. No. 11,159,321, which claims the benefit of U.S. Patent Application No. 62/781,912, filed Dec. 19, 2018 and titled "Digital Notarization Using a Biometric Identification Service," the disclosures of which are hereby incorporated herein by reference in their entireties.

FIELD

The described embodiments relate generally to digital notarization. More particularly, the present embodiments relate to digital notarization using a biometric identification service.

BACKGROUND

Signatures have long been used to validate agreement of particular people to contracts, acknowledge information contained in a document, participation in a written transaction, and for a variety of other purposes. However, in order to subsequently verify that a signature validates agreement, acknowledgement, participation, and so on for a particular person, the signature must be verified as the signature for that person.

In some situations, a person may be asked to verify his signature. However, this approach is cumbersome, time consuming, and not much different than having the person sign all over again. In other situations, a signature expert may analyze the signature to verify that the signature belongs to a person. However, this is also cumbersome and time consuming, and requires extensive research for any significant fidelity level (confidence that the signature is correctly verified as belonging to a particular person).

Notaries were developed to verify these kinds of signature validations. Notaries are entities who attest to the validity of signatures. The usefulness of a notary depends on the reputation of the notary. Typically, notaries have a set procedure by which they verify a person's identity by checking official identification, observing the person sign, and marking the document. The notarization allows the trustworthiness of the notary to substitute for investigation into the validity of a signature. As long as the notary can be trusted, the notarization verifies the validity of the signature.

SUMMARY

The present disclosure relates to digital notarization using a biometric identification service. A signature requesting service may receive a request to validate a digital item with a signature for a person. The signature requesting service may provide a payload that identifies the digital item and/or the person to an identity service. The identity service may obtain one or more digital representations of biometrics for the person, determine an identity for the person, and return a data structure including the payload and one or more identity attestations regarding the determined identity. The identity service encrypts at least a portion of the data structure using a private encryption key. A public encryption key for the identity service can then be used to decrypt the portion to verify that the data structure was generated by the identity service after determining the identity. In this way, the validation can be verified to the full trust level of the identification service.

In various embodiments, a system for digital notarization using a biometric identification service includes at least one non-transitory storage medium that stores instructions, a biometric reader device, a communication unit, and at least one processor communicably coupled to the biometric reader device and the communication unit. The at least one processor executes the instructions to receive a payload from a signature requesting service using the communication unit, the payload identifying a digital item to validate with a signature; obtain at least one digital representation of a biometric using the biometric reader device; receive a data structure from an identification service using the communication unit, the data structure including the payload and an identity attestation generated using the at least one digital representation of the biometric, at least a portion of the data structure encrypted using a private encryption key of the identification service; and transmit the data structure to the signature requesting service using the communication unit.

In some examples, the identity attestation includes a liveness determination related to the at least one digital representation of the biometric. In various implementations of such examples, the at least one processor generates the liveness determination by analyzing the at least one digital representation of the biometric or least one additional digital representation of a biometric and transmits the liveness determination to the identification service using the communication unit along with the payload and the at least one digital representation of the biometric.

In various examples, the at least one processor implements a signature requesting service module that performs processing to receive the payload and transmits the data structure and an identification system module that obtains the at least one digital representation of the biometric and receives the data structure. In some implementations of such examples, the signature requesting service module and the identification system module communicate to exchange the payload and the data structure.

In some examples, the at least one processor instructs the identification service regarding which of a set of identity information to include in the identity attestation. In various examples, the at least one processor instructs the identification service regarding an identity fidelity level to use in generating the identity attestation.

In some embodiments, a system for digital notarization using a biometric identification service includes at least one non-transitory storage medium that stores instructions, a communication unit, and at least one processor communicably coupled to the communication unit. The at least one processor executes the instructions to receive a payload from a signature requesting service using the communication unit, the payload identifying a digital item to validate with a signature; obtain at least one digital representation of a biometric; determine a liveness of the at least one digital representation of the biometric; determine an identity using the at least one digital representation of the biometric; generate an identity attestation using the identity and the liveness; generate a data structure that includes the payload and the identity attestation; encrypt at least a portion of the data structure using an identification service private encryption key; and transmit the data structure to the signature requesting service using the communication unit.

In various examples, the at least one processor encrypts the identity attestation in the data structure using a symmetric identity attestation encryption key, generates an encrypted version of the symmetric identity attestation encryption key using the identification service private encryption key, and includes the encrypted version of the symmetric identity attestation encryption key in the data structure. In some examples, the at least one processor generates a hash of the payload and includes the hash of the payload in the identity attestation. In various examples of such implementations, the data structure includes the payload, the hash of the payload in the identity attestation, and information regarding a procedure used to generate the hash of the payload.

In some examples, the at least one processor determines the identity according to an identity fidelity level specified in the payload. In certain examples of such implementations, the at least one processor includes the identity fidelity level in the identity attestation.

In various examples, the at least one processor includes a set of identity information in the identity attestation as specified by a person associated with the identity. In some examples, the at least one processor determines the identity by comparing the at least one digital representation of the biometric to stored biometric data wherein the stored biometric data is associated with the identity. In certain examples, the at least one processor determines the identity by verifying access to an account wherein the account is associated with the identity and validating that the at least one digital representation of the biometric matches biometric data stored for the identity.

In various embodiments, a system for digital notarization using a biometric identification service includes at least one non-transitory storage medium that stores instructions, a communication unit, and at least one processor communicably coupled to the communication unit. The at least one processor executes the instructions to determine to validate a digital item with a signature; generate a payload that identifies the digital item to validate; transmit the payload to an identification service using the communication unit; receive a data structure from the identification service using the communication unit, the data structure including the payload and an identity attestation generated using at least one digital representation of the biometric, at least a portion of the data structure encrypted using a private encryption key of the identification service; and store the data structure associated with the digital item in the at least one non-transitory storage medium.

In some examples, the at least one processor uses a public encryption key of the identification service to decrypt the portion of the data structure, extracts the payload and the identity attestation from the data structure, and uses the payload and the identity attestation to verify validation of the digital item. In various examples, the at least one processor identifies a person for the signature in the payload. In certain examples, the at least one processor includes in the payload at least one of an identity fidelity level to use in generating the identity attestation or a set of identity information to include in the identity attestation.

BRIEF DESCRIPTION OF THE DRAWINGS

The disclosure will be readily understood by the following detailed description in conjunction with the accompanying drawings, wherein like reference numerals designate like structural elements.

FIG. 8 depicts an example attestation request that may be used in the systems of FIGS. 1 and/or 2 and/or one or more of the methods of FIGS. 3-6.

FIG. 9 depicts an example data structure that may be used in the systems of FIGS. 1 and/or 2 and/or one or more of the methods of FIGS. 3-6.

DETAILED DESCRIPTION

Figure 1:
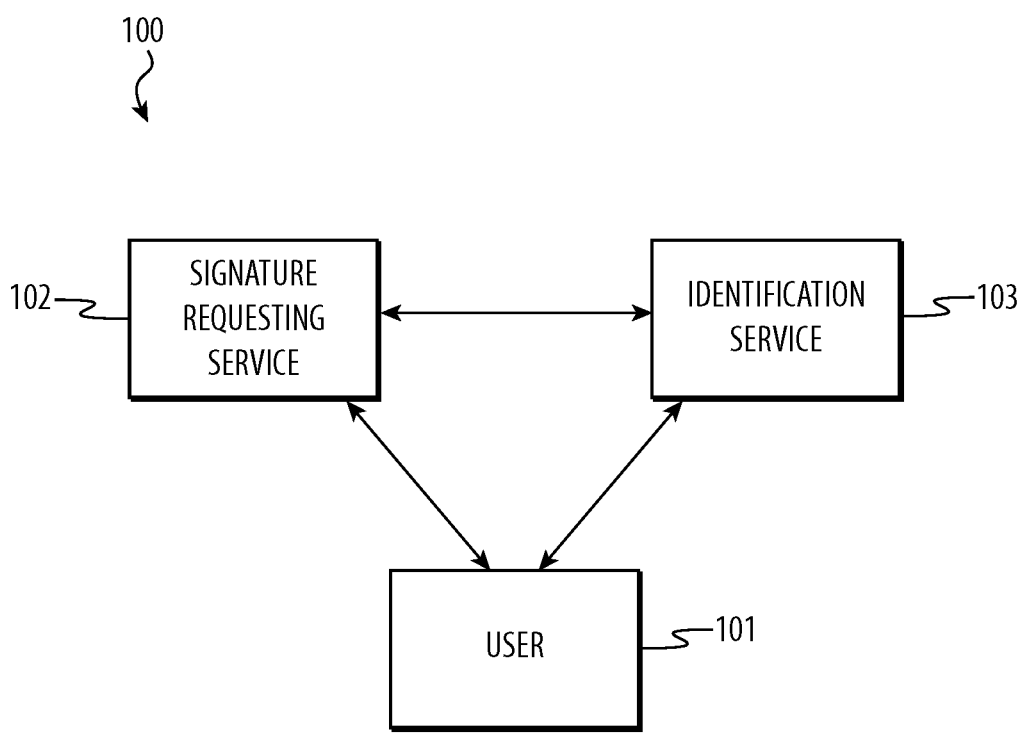
FIG. 1 depicts a first example system for digital notarization using a biometric identification service.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems, apparatuses, methods, and computer program products that embody various elements of the present disclosure. However, it should be understood that the described disclosure may be practiced in a variety of forms in addition to those described herein.

Signatures and notarizations are typically physically made onto documents that evidence agreements, contracts, statements, and so on. Digital items (such as electronic mortgage or other applications, digital documents or other files, electronic transactions, electronic contracts, electronic information disclosures, and so on) cannot be physically signed or notarized as they do not have a physical form. Electronic signature services have been developed that allow a person to sign into an account in order to electronically "sign" a digital item. An electronic record is then kept that indicates that the account "signed" the particular digital item.

However, the fidelity level of such electronic signature services may not be particularly high. To begin with, they may only truly verify that someone who knew the login credentials for the account signed. As someone other than the account holder could learn the login credentials, there may not be a high degree of certainty that the account holder signed as opposed to someone else who managed to access the account. Further, such electronic signature services may not perform significant authentication that an account holder is a particular person. They may not check official identification and/or otherwise reliably authenticate identity. They may trust that a person signing up for an account is who the person asserts himself to be, or may authenticate the person's identity using knowledge that another person could obtain for the purpose of creating a fraudulent signature account.

Thus, verification of validations made using electronic signatures made by these electronic signature services may not have a high level of fidelity. This may be due to lack of confidence in the way that the electronic signature service authenticates identities, the way that the electronic signature service verifies that the account is used to sign by the same person who set up the account, and so on. The less that the verification of validations made using electronic signatures made by the electronic signature service can be trusted, the less useful the validation becomes. If the fidelity level is low enough, the verification may not be any more useful than not verifying at all as the person signing may still need to be called in later to confirm that he signed.

The following disclosure relates to digital notarization using a biometric identification service. A signature requesting service may receive a request to validate a digital item with a signature for a person. The signature requesting service may provide a payload that identifies the digital item and/or the person to an identity service. The identity service may obtain one or more digital representations of biometrics for the person, determine an identity for the person, and return a data structure including the payload and one or more identity attestations regarding the determined identity. The identity service encrypts at least a portion of the data structure using a private encryption key. A public encryption key for the identity service can then be used to decrypt the portion to verify that the data structure was generated by the identity service after determining the identity. In this way, the validation can be verified to the full trust level of the identification service.

In this way, the data structure may be a notarization of the digital item. The signature requesting service may thus not need to verify the user's identity and may be freed from having to store biometric or other personal data, having to include equipment for storing and evaluating such biometric or other personal data and/or verifying the user's identity, and so on. This may allow the signature requesting service to perform functions not otherwise possible faster and/or more efficiently while reducing redundant components and consumption of unnecessary resources. The signature requesting service may instead be able to rely on the strength and fidelity and/or reputation of identifications made by the identification service, which may be able to provide notarizations to a wide variety of signature requesting services without requiring reconfiguration of the system. Further, verification does not require further participation of the identification service and can still be performed even if the identification service is no longer operating.

These and other embodiments are discussed below with reference to FIGS. 1-16. However, those skilled in the art will readily appreciate that the detailed description given herein with respect to these Figures is for explanatory purposes only and should not be construed as limiting.

FIG. 1 depicts a first example system 100 for digital notarization using a biometric identification service. The system includes a number of entities that may communicate using one or more electronic devices interconnected by one or more communication networks. As illustrated, the system 100 may involve interactions between a user 101, a signature requesting service 102, and an identification service 103.

The signature requesting service 102 may be any entity that requests the user 101 to sign a digital item. Such a digital item may include an electronic mortgage application or other digital file, an online purchase or other transaction, and/or any other digital item that may be signed by the user 101. The user 101 may send a request to the signature requesting service 102 to sign the item. The identification service 103 may then determine an identity of the user 101 and provide one or more encrypted data structures or other data structures including attestations regarding the identity to the signature requesting service 102, validating that the user 101 signed and was participating with the signature requesting service 102 and the digital item when signing. The signature requesting service 102 may store the identity attestation, such as with and/or associated with the digital item. The stored identity attestation may be later used (such as by the signature requesting service 102, the identification service 103, and so on) to verify that the identification service 103 validated that the user 101 signed and was participating with the signature requesting service 102 and the digital item when signing.

In this way, the identity attestation may be a notarization of the digital item performed by the identification service 103. The signature requesting service 102 may thus not need to verify the user's identity and may be freed from having to store biometric or other personal data, having to include equipment for storing and evaluating such biometric or other personal data and/or verifying the user's identity, and so on. This may allow the signature requesting service 102 to perform functions not otherwise possible faster and/or more efficiently while reducing redundant components and consumption of unnecessary resources. The signature requesting service 102 may instead be able to rely on the strength and fidelity and/or reputation of identifications made by the identification service 103, which may be able to provide notarizations to a wide variety of signature requesting services 102 without requiring reconfiguration of the system 100.

One or more portions of the identity attestation may be encrypted using a private encryption key for the identification service 103. Thus, a corresponding public encryption key for the identification service 103 may be used to decrypt the identity attestation to verify the user 101 signed and was participating with the signature requesting service 102 and the digital item when signing. Private encryption keys and associated public encryption keys may be part of an asymmetric encryption key system where private encryption keys are kept secret and used to encrypt data and associated public encryption keys are made available to others and used to decrypt the data encrypted using the respective private encryption key. This is contrasted with symmetric encryption key systems where the same encryption key is used to both encrypt and decrypt data. By the fact that the public encryption key can be used to decrypt the identity attestation, the identity attestation proves that the identification service 103 validated. Further, as the identity attestation thus contains its own proof that the identification service 103 validated, the identification service 103 may not need to be involved in verifying validation. The identification service 103 may not even need to still be in operation in order to verify validation.

In some examples, the identification service 103 may obtain digital representations of one or more biometrics (such as digital representation of one or more fingerprints, palm prints, retina scans, iris scans, facial images, gaits, heart rhythms or other biological information, and/or any other information about the user's body that may be used to identify the user) from the user 101 in order to verify the user's identity. The identification service 103 may compare the digital representation of the biometric to stored biometric information associated with people's identities. In some implementations, the identification service 103 may store identity information for a number of people along with biometric data after the identities have been authenticated for the people as part of enrollment in a biometric identification system. Based on a match, the identification service 103 may identify an associated identity and/or provide the identity attestation using various information stored for that identity. In various implementations, the identification service may be operable to include a variety of different information from the identity in the identity attestation and/or to identify people at different levels of fidelity (e.g., different levels of certainty that the user 101 is the person identified).

Identification using biometrics may be able to provide identifications with a higher level of fidelity and assurance that the user 101 is actually present and participating than other identification mechanisms. For example, knowledge-based identification mechanisms such as logins and/or passwords only verify the appropriate knowledge. People other than the user 101 can learn the user's logins and/or passwords. By way of another example, identification mechanisms that send authentication messages to a device the user 101 has, such as authentication text messages sent to the user's mobile telephone, can be compromised if someone other than the user 101 comes into possession of the device. However, the user 101 is the only one in possession of the user's biometrics. Different biometrics may be used to identify an identity with different levels of fidelity, and the identity so identified may be authenticated to different levels of strength during enrollment, but biometrics can be used to provide identifications with a higher level of fidelity and assurance that the user 101 is actually present than other mechanisms that more easily can come under the access and control of other people.

Further, the liveness of a biometric may also be determined. A biometric may be live if the user 101 is present and providing the biometric as opposed to another person trying to reproduce the biometric (such as using a previously captured image of the user's biometric, by capturing the person's biometric when the user 101 is unaware, and so on). Determining that the biometric is live may provide additional certainty that the user 101 signed and was participating with the signature requesting service 102 and the digital item when signing. In some implementations, a liveness determination of the biometric may be included with the identity attestation.

In various examples, the identification service 103 may include information regarding the digital item in the identity attestation. For example, the signature requesting service 102 may provide a payload that includes information specifying details regarding the digital item (such as an identifier for the digital item, a name of the user 101, and/or any other information). In such examples, the identification service 103 may include the payload with the identity attestation, a hash or other derivation of the payload, and so on. Inclusion of this information with the identity attestation may provide further proof tying the attested identity to the specific digital item. As such, the identity attestation itself may contain proof not only that the user 101 signed and was participating with the signature requesting service 102 and the digital item when signing, but specifically what digital item the user signed.

In some implementations, the signature requesting service 102 may encrypt the payload with a private encryption key of the signature requesting service 102. In this way, an associated public encryption key for the signature requesting service 102 may be used to decrypt the payload once extracted from the identity attestation in order to verify that the signature requesting service 102 provided the payload that was used to produce the identity attestation. This may provide further certainty regarding the specific digital item that the user 101 signed.

The user 101, the signature requesting service 102, and/or the identification service 103 may interact in a variety of ways to request signing of a digital item, provide information about the digital item to be signed, obtain digital representation of biometrics, identify the person, determine the fidelity level of the identity attestation (i.e., certainty level of the identification) to provide, determine information associated with the identity to include in the identity attestation, and so on. For example, the user 101 may communicate with the signature requesting service 102 to request to sign a digital item. The signature requesting service 102 may communicate with the identification service 103 regarding what is being signed and by whom. The identification service 103 may communicate with the user 101 to obtain one or more digital representations of biometrics and/or other information. The identification service 103 may communicate with the signature requesting service 102 to provide the identity attestation. Various configurations are possible and contemplated without departing from the scope of the present disclosure.

Figure 2:
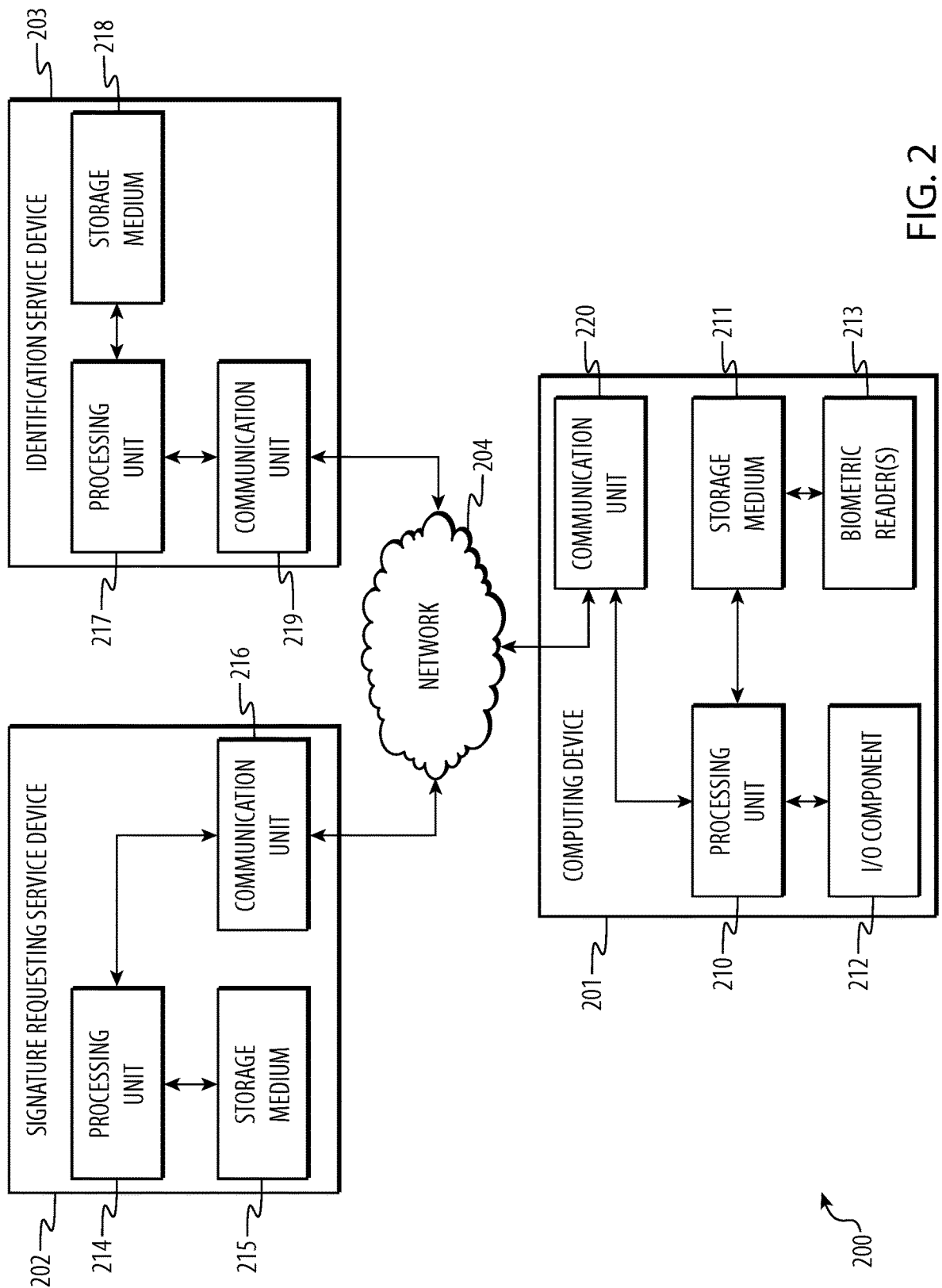
FIG. 2 depicts a second example system for digital notarization using a biometric identification service.

FIG. 2 depicts a second example system 200 for digital notarization using a biometric identification service. The system 200 may include one or more computing devices 201, signature requesting service devices 202, and/or identification service devices 203.

The computing device 201 may be any kind of computing device, such as a laptop computing device, a desktop computing device, a mobile computing device, a mobile telephone, a wearable device, a digital media player, a station (such as a kiosk), and so on. The computing device 201 may include one or more processing units 210, one or more non-transitory storage media 211 (which may take the form of, but is not limited to, a magnetic storage medium; optical storage medium; magneto-optical storage medium; read only memory; random access memory; erasable programmable memory; flash memory; and so on), input/output components 212 (such as one or more keyboards, displays, touch displays, computer mice, buttons, and so on), biometric reader devices 213 (such as one or more phosphorescent, optical, and/or other fingerprint sensors; one or more cameras and/or other 2D or 3D image capture devices operable to capture images of at least a portion of a person's face, gait, and so on; heart rhythm monitors or other biological sensors; and/or any device operable to capture distinctive biometric information from people), communication units 220, and so on. The processing unit 210 may execute instructions stored in the non-transitory storage medium 211 to perform various computing device 201 functions, such as various digital notarization functions.

Similarly, the signature requesting service device 202 may include one or more processing units 214, non-transitory storage media 215, communication units 216, and so on. The processing unit 214 may execute instructions stored in the non-transitory storage medium 215 to perform various signature requesting service device 202 functions, such as various digital notarization functions. Likewise, the identification service device 203 may include one or more processing units 217, non-transitory storage media 218, communication units 219, and so on. The processing unit 217 may execute instructions stored in the non-transitory storage medium 218 to perform various identification service device 203 functions, such as various digital notarization functions.

For example, the computing device 201 may receive a request from a user via the input/output component 212 to sign a digital item via a signature requesting service. As such, the computing device 201 may communicate with the signature requesting service device 202 via one or more communication networks 204 using the communication unit 216. The signature requesting service device 202 may communicate with the identification service device 203 regarding the request and the identification service device 203 may obtain one or more digital representations of one or more biometrics via the biometric reader device 213 of the computing device 201. The identification service device 203 may identify the user and provide one or more attestations to the signature requesting service device 202, such as included in an encrypted data structure.

In some examples, the computing device 201 may be a user controlled computing device, such as a user's mobile telephone, tablet computing device, laptop computing device, desktop computing device, wearable device (such as a smart watch, smart glasses, and so on), and so on. In other examples, the computing device 201 may be a station that a user can use to access the signature requesting service, the identification service, to sign digital items using the signature requesting service and the identification service, and so on. In some implementations, the station may be controlled by the identification service. Various configurations are possible and contemplated without departing from the scope of the present disclosure.

Figure 3:
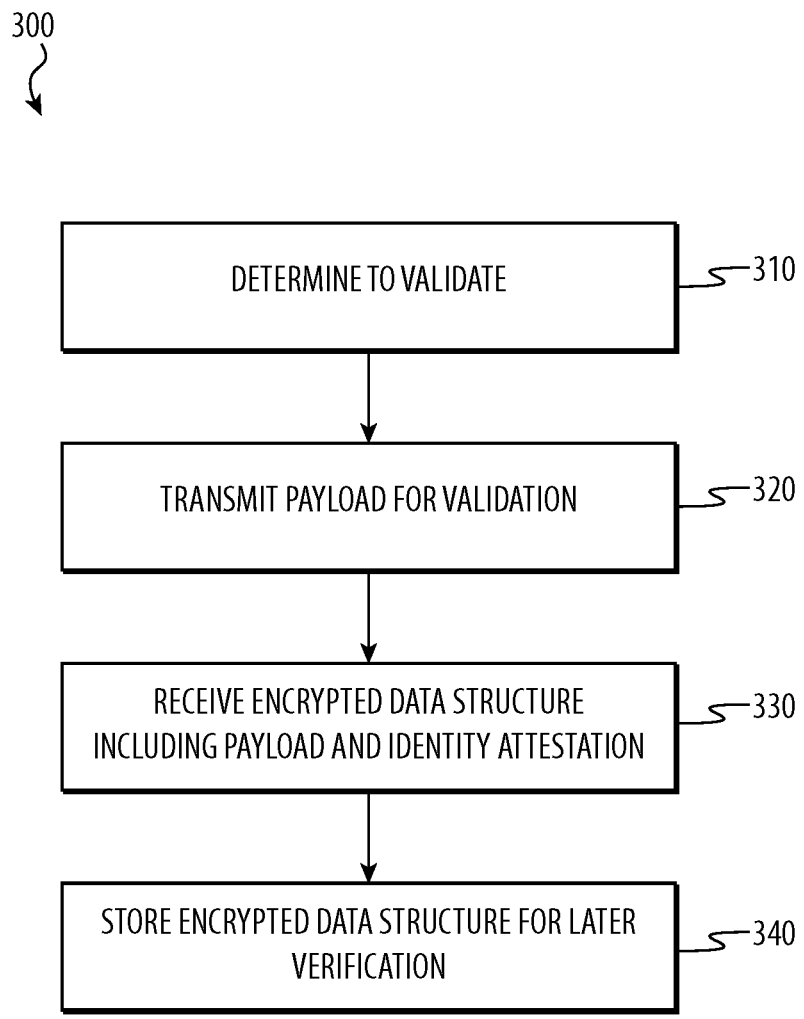
FIG. 3 depicts a flow chart illustrating a first example method for digital notarization using a biometric identification service. This method may be performed by the systems of FIGS. 1 and/or 2.

FIG. 3 depicts a flow chart illustrating a first example method 300 for digital notarization using a biometric identification service. This method 300 may be performed by the systems 100, 200 of FIGS. 1 and/or 2. For example, the method 300 may be performed by an electronic device like the signature requesting service device 202 of FIG. 2, though it is understood that this is an example.

At operation 310, the electronic device determines to validate a digital item. For example, the electronic device may determine to validate a digital item in response to receiving a request from a user to sign the digital item.

The flow may proceed to operation 320 where the electronic device transmits a payload for validation. The electronic device may transmit the payload to an identification service. The payload may specify details regarding the digital item for validation, the user for whom to validate the digital item, and so on. In some implementations, one or more portions of the payload may be encrypted. For example, the electronic device may encrypt details specified in the payload using a signature requesting service private encryption key.

Next, the flow may proceed to operation 330 where the electronic device receives an encrypted data structure including the payload and one or more identity attestations. For example, the electronic device may receive the encrypted data structure from an identification service in response to transmitting the payload. The identification service may have identified the user associated with the payload, such as by obtaining and evaluating one or more digital representations of biometrics (which may include determining a liveness of the biometric), and generated the encrypted data structure accordingly. By way of illustration, the identification service may encrypt a portion of the encrypted data structure using a private encryption key for the identification service.

The flow may then proceed to operation 340 where the electronic device stores the encrypted data structure for later verification. The electronic device may store the encrypted data structure with the digital item, associated with the digital item, and so on.

Although the example method 300 is illustrated and described as including particular operations performed in a particular order, it is understood that this is an example. In various implementations, various orders of the same, similar, and/or different operations may be performed without departing from the scope of the present disclosure.

For example, the above illustrates and describes the data structure as an encrypted data structure. However, this may not mean that the entire data structure is encrypted. In various implementations, one or more portions of the encrypted data structure may be encrypted without encrypting the entire data structure. Various configurations are possible and contemplated without departing from the scope of the present disclosure.

In various examples, this example method 300 may be implemented as a group of interrelated software modules or components that perform various functions discussed herein. These software modules or components may be executed within a cloud network and/or by one or more computing devices, such as the computing device 201, the signature requesting service device 202, and/or the identification service device 203 of FIG. 2.

Figure 4:
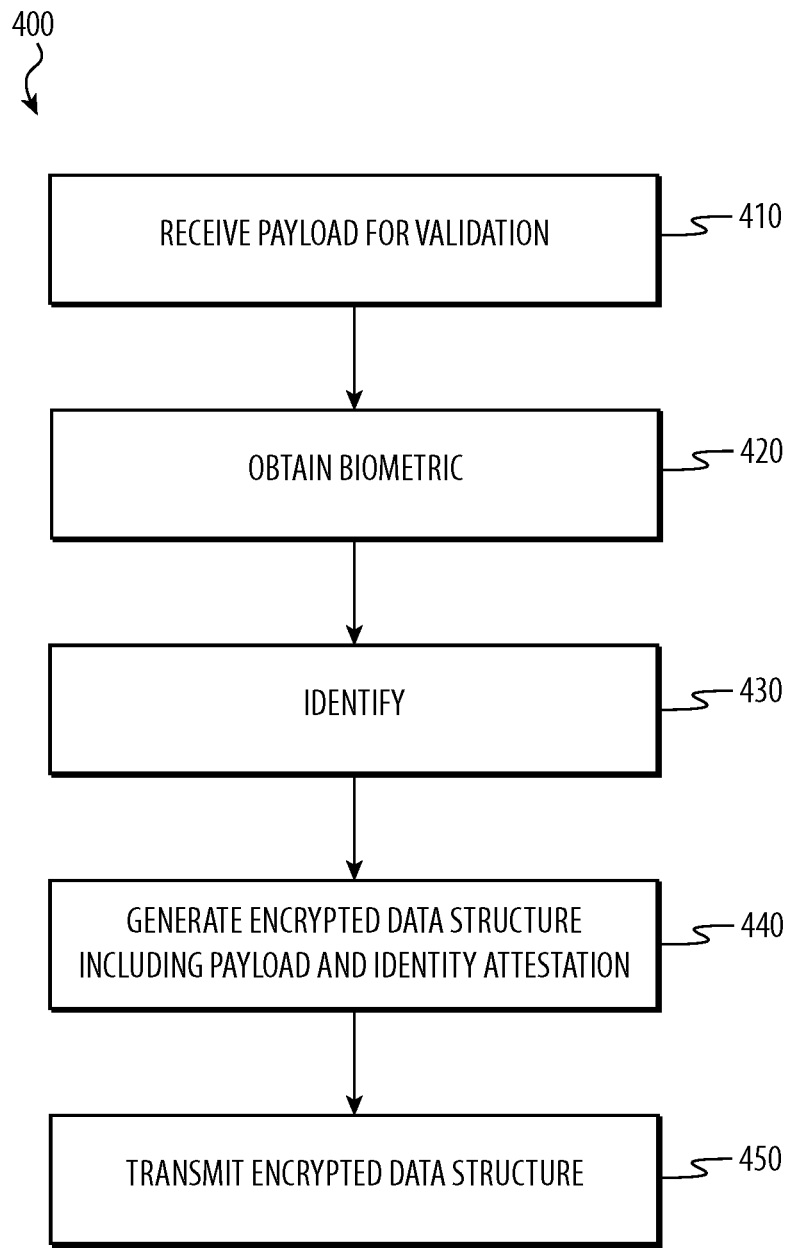
FIG. 4 depicts a flow chart illustrating a second example method for digital notarization using a biometric identification service. This method may be performed by the systems of FIGS. 1 and/or 2.

FIG. 4 depicts a flow chart illustrating a second example method 400 for digital notarization using a biometric identification service. This method 400 may be performed by the systems 100, 200 of FIGS. 1 and/or 2. For example, the method 400 may be performed by an electronic device like the identification service device 203 of FIG. 2, though it is understood that this is an example.

At operation 410, the electronic device receives a payload for validation. The payload may be generated by a signature requesting service in response to receiving a request to sign a digital item. The flow may proceed to operation 420 where the electronic device obtains at least one digital representation of a biometric. For example, the electronic device may obtain the digital representation of the biometric from the biometric reader device of another electronic device. The flow may then proceed to operation 430 where the electronic device uses the digital representation of the biometric to identify the identity of a person.

Next, at operation 440, the electronic device may generate an encrypted data structure including the payload and at least one identity attestation made using the identity. The flow may then proceed to operation 450 where the electronic device transmits the encrypted data structure. For example, the electronic device may transmit the encrypted data structure to a signature requesting service that provided the payload.

Although the example method 400 is illustrated and described as including particular operations performed in a particular order, it is understood that this is an example. In various implementations, various orders of the same, similar, and/or different operations may be performed without departing from the scope of the present disclosure.

For example, operation 430 is illustrated and described as identifying an identity of a person using the digital representation of the biometric. However, it is understood that this is an example. In some implementations, a person may identify themselves using a login and password or other account identifier associated with their identity and then provide the digital representation of the biometric to verify that the person is the account holder associated with the login and password. In various implementations, the electronic device and/or another electronic device may determine a liveness of the biometric before the digital representation of the biometric is used for identification. Various configurations are possible and contemplated without departing from the scope of the present disclosure.

In various examples, this example method 400 may be implemented as a group of interrelated software modules or components that perform various functions discussed herein. These software modules or components may be executed within a cloud network and/or and/or by one or more computing devices, such as the computing device 201, the signature requesting service device 202, and/or the identification service device 203 of FIG. 2.

Figure 5:
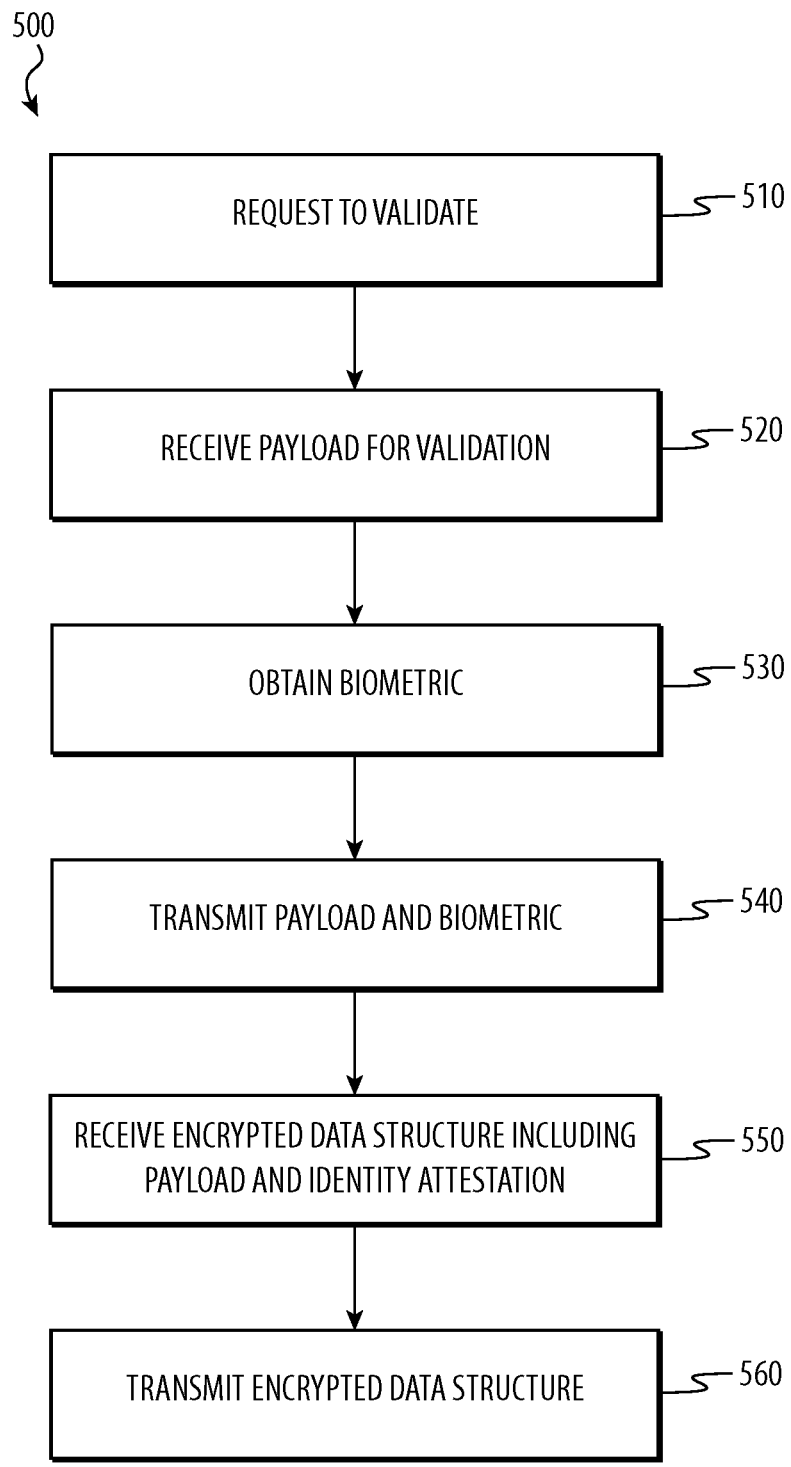
FIG. 5 depicts a flow chart illustrating a third example method for digital notarization using a biometric identification service. This method may be performed by the systems of FIGS. 1 and/or 2.

FIG. 5 depicts a flow chart illustrating a third example method 500 for digital notarization using a biometric identification service. This method 500 may be performed by the systems 100, 200 of FIGS. 1 and/or 2. For example, the method 500 may be performed by an electronic device like the computing device 201 of FIG. 2, though it is understood that this is an example.

At operation 510, the electronic device requests to validate a digital item. For example, the electronic device may receive a request from a user (such as by a user clicking on a link in a web browser and so on) to validate a digital item via a signature requesting service. In response, the electronic device may transmit the request to the signature requesting service.

At operation 520, the electronic device may receive a payload for validation. The payload may specify the digital item to be validated, the user, and/or other information. The electronic device may receive the payload from the signature requesting service.

At operation 530, the electronic device may obtain one or more digital representations of biometrics. For example, the electronic device may obtain the digital representation of the biometric using one or more biometric reader devices at operation 530. In some implementations, the electronic device may also determine a liveness of the biometric.

At operation 540, the electronic device may transmit the payload and the digital representation of the biometric. For example, the electronic device may transmit the payload and the digital representation of the biometric to an identification service.

At operation 550, the electronic device may receive an encrypted data structure including the payload and at least one identity attestation. The electronic device may receive the encrypted data structure from the identification service. The electronic device may receive the encrypted data structure in response to transmitting the payload and the digital representation of the biometric.

Alternatively, the data structure may be provided directly to the signature requesting service and/or another device (which may be determined using information in the payload). This may prevent tampering with the data structure. In such an example, a confirmation of the data structure may be sent to the electronic device. In other examples, the data structure may be provided to the electronic device as well as to the signature requesting service directly. In such implementations, a notification that the data structure was sent directly to the signature requesting service may also be provided to the electronic device. Various configurations are possible and contemplated without departing from the scope of the present disclosure.

At 560, the electronic device transmits the encrypted data structure. For example, the electronic device may transmit the encrypted data structure to the signature requesting service. The electronic device may transmit the encrypted data structure to the signature requesting service as a response to the received payload.

Although the example method 500 is illustrated and described as including particular operations performed in a particular order, it is understood that this is an example. In various implementations, various orders of the same, similar, and/or different operations may be performed without departing from the scope of the present disclosure.

For example, operations 530-540 illustrate and describe obtaining the biometric and then transmitting the payload and the digital representation of the biometric. However, it is understood that this is an example. In some implementations, the electronic device may transmit the payload to the identification service and then receive a request for the digital representation of the biometric. In such an implementation, the electronic device may then obtain the digital representation of the biometric using the biometric reader device. Various configurations are possible and contemplated without departing from the scope of the present disclosure.

In various examples, this example method 500 may be implemented as a group of interrelated software modules or components that perform various functions discussed herein. These software modules or components may be executed within a cloud network and/or by one or more computing devices, such as the computing device 201, the signature requesting service device 202, and/or the identification service device 203 of FIG. 2.

Figure 6:
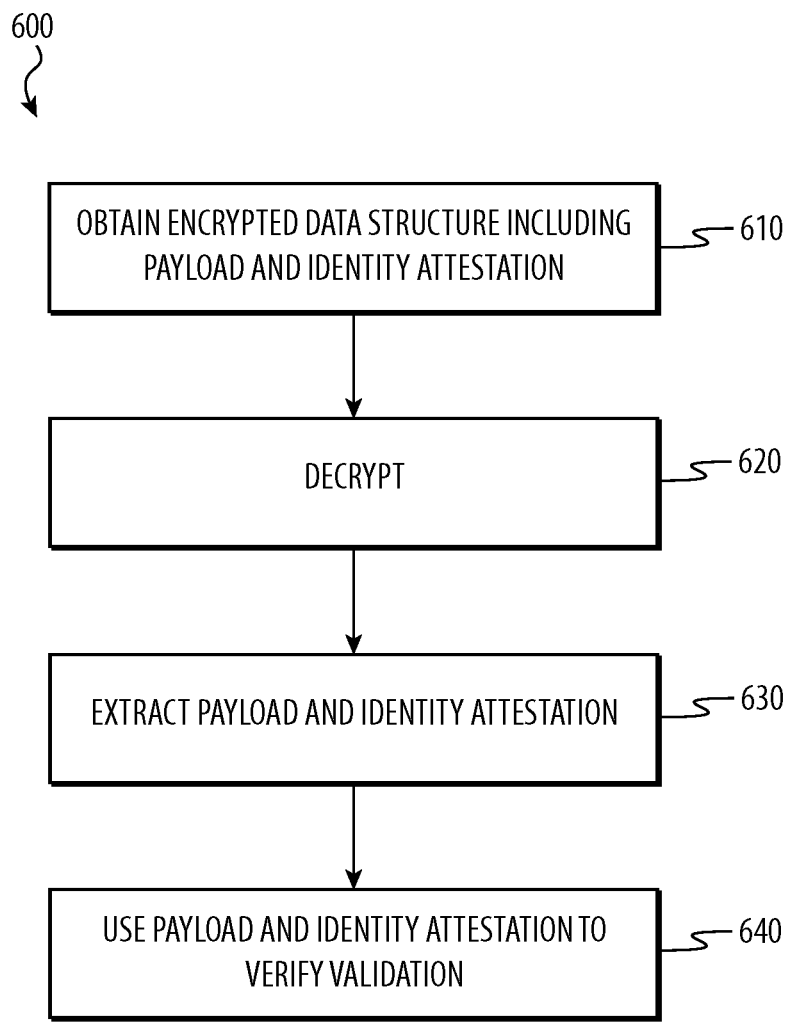
FIG. 6 depicts a flow chart illustrating a fourth example method for digital notarization using a biometric identification service. This method may be performed by the systems of FIGS. 1 and/or 2.

FIG. 6 depicts a flow chart illustrating a fourth example method 600 for digital notarization using a biometric identification service. This method 600 may be performed by the systems 100, 200 of FIGS. 1 and/or 2. For example, the method 600 may be performed by an electronic device like the computing device 201 of FIG. 2, the signature requesting service device 202 of FIG. 2, and/or the identification service device 203 of FIG. 2, though it is understood that this is an example.

At operation 610, the electronic device obtains an encrypted data structure including a payload and at least one identity attestation. The electronic device may obtain the encrypted data structure from another electronic device for the purpose of validation. The encrypted data structure may be one or more of the encrypted data structures discussed above with respect to FIGS. 3-5.

At operation 620, the electronic device may decrypt at least a portion of the encrypted data structure. For example, the electronic device may obtain the public encryption key for the identification service that generated the encrypted data structure. The public encryption key for the identification service may be associated with the private encryption key of the identification service that the identification service used to encrypt a portion of the encrypted data structure. The electronic device may use the public encryption key of the identification service to decrypt the portion of the encrypted data structure that the identification service encrypted using the private encryption key for the identification service.

At operation 630, after decryption of at least the portion of the encrypted data structure, the electronic device extracts the payload and the identity attestation.

At operation 640, after extraction of the payload and the identity attestation, the electronic device may use the payload and identity attestation to verify the validation. The electronic device may verify the validation of a signature for a digital item associated with the encrypted data structure. The electronic device may also verify the identity of the person who signed, the fact that the person was present and cooperating at the time of signature, payload information related to the digital item signed, liveness information of one or more digital representations of biometrics involved in signing, identity information included in the encrypted data structure, and/or other information related to the encrypted data structure and/or the digital item. In some implementations, verification may involve comparing various information extracted from the encrypted data structure, such as comparing a hash value of the payload generated by the identification service and included in the encrypted data structure to an original copy of the payload also included in the encrypted data structure.

Although the example method 600 is illustrated and described as including particular operations performed in a particular order, it is understood that this is an example. In various implementations, various orders of the same, similar, and/or different operations may be performed without departing from the scope of the present disclosure.

For example, operations 630-640 describe decryption and extraction as a single set of linearly performed operations. However, in some implementations, the encrypted data structure may include multiple different encrypted portions and/or portions that may be encrypted more than one time. In such implementations, decryption and extraction of the payload and identity attestation may be a multiple step process without departing from the scope of the present disclosure.

In various examples, this example method 600 may be implemented as a group of interrelated software modules or components that perform various functions discussed herein. These software modules or components may be executed within a cloud network and/or by one or more computing devices, such as the computing device 201, the signature requesting service device 202, and/or the identification service device 203 of FIG. 2.

FIG. 2 illustrates the system 200 as involving separate devices that each perform distinct functions. However, in some examples, the computing device 201 may include a number of software modules that communicate with the signature requesting service device 202 and/or the identification service device 203 as part of performing some or all of the functions attributed to the signature requesting service and/or the identification service.

Figure 7:
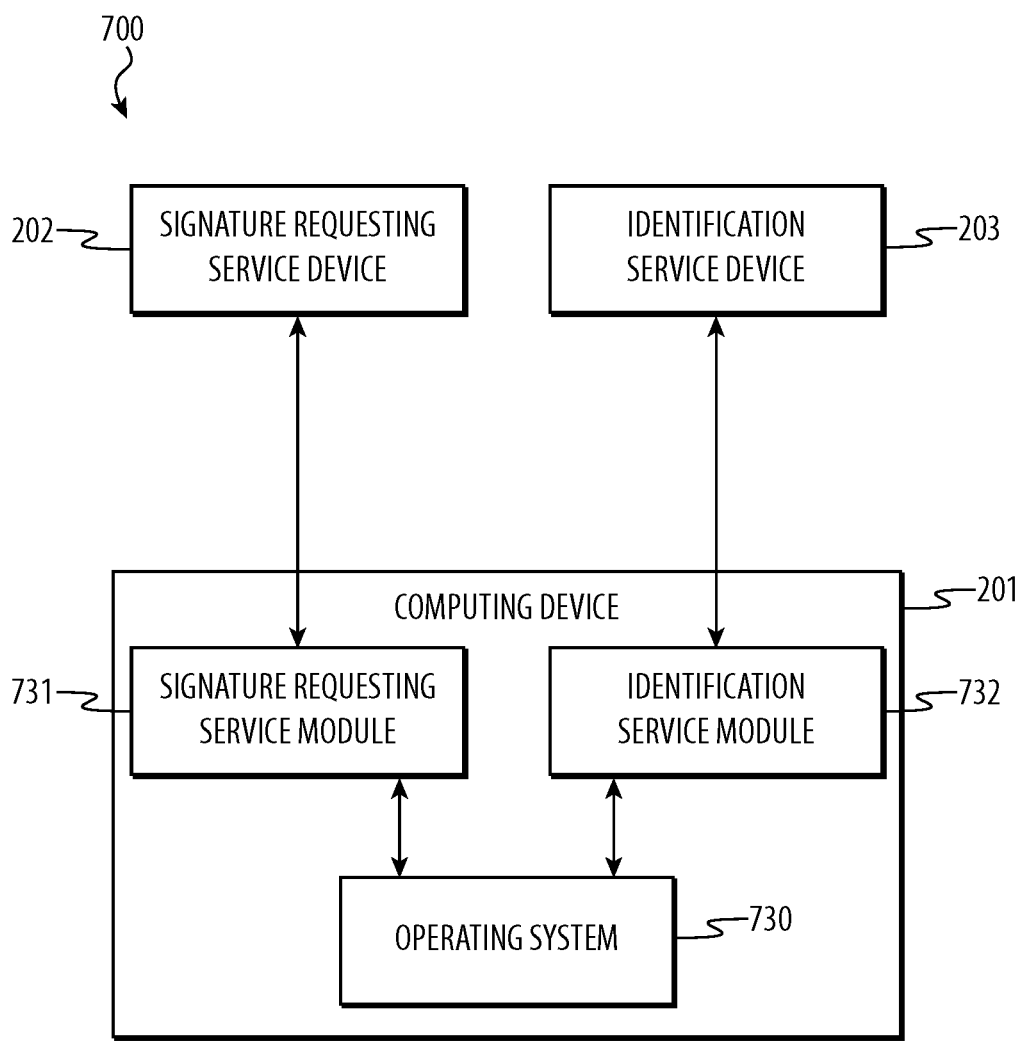
FIG. 7 depicts an example software module configuration that may be used to implement the system of FIG. 2.

For example, FIG. 7 depicts an example software module configuration 700 that may be used to implement the system 200 of FIG. 2. As shown, the computing device 201 may execute software instructions to implement and execute an operating system 730 as well as a signature requesting service module 731 and/or an identification service module 732. The computing device 201 may use the signature requesting service module 731 to perform various signature requesting service functions, such as communicating with the signature requesting service device 202. Similarly, the computing device 201 may use the identification service module 732 to perform various signature requesting service functions, such as communicating with the identification service device 203.

For example, the operating system 730 may handle receiving input from a user and/or providing output to the user via one or more input/output components. The operating system 730 may pass signature requesting service input to the signature requesting service module 731 and/or receive signature requesting service output from the signature requesting service module 731. Similarly, the operating system 730 may pass identification service input to the identification service module 732 and/or receive identification service output from the identification service module 732. Likewise, the signature requesting service module 731 may exchange signature requesting service input/output to and/or from the signature requesting service device 202 and/or the identification service module 732 may exchange identification service input/output to and/or from the identification service device 203. The signature requesting service module 731 and the identification service module 732 may also communicate directly with each other.

In this way, the computing device 201 may perform some or all of the functions described above with respect to the signature requesting service or signature requesting service device 202 and/or the identification service or identification service device 203. At the same time, this may still isolate functions and/or data between the operating system 730, the signature requesting service module 731, and/or the identification service module 732 as if the functions were performed by and/or the data resided on different devices.

For example, the signature requesting service module 731 may receive information from the signature requesting service device 202 regarding presentation of an option to sign a digital item. The signature requesting service module 731 may pass this information to the operating system 730, which may output the information and/or receive a request to sign the digital item. The operating system 730 may pass the received request to the signature requesting service module 731, which may then generate a payload associated with the digital item and/or receive the payload from the signature requesting service device 202. The signature requesting service module 731 may communicate the payload to the identification service module 732, which may then communicate with the operating system 730 to obtain one or more digital representations of biometrics, liveness determinations of such biometrics, and so on. The identification service module 732 may communicate with the identification service device 203 (such as by transmitting the payload and/or digital representation of the biometric and/or the liveness determination) to identify an identity of the person associated with the digital representation of the biometric, generate and/or receive an encrypted data structure that includes the payload and one or more attestations based on the identity, and so on. The identification service module 732 may pass the encrypted data structure to the signature requesting service module 731, which may store the encrypted data structure and/or transmit the encrypted data structure to the signature requesting service device 202 for storage.

However, it is understood that this is an example. In some implementations, one or more functions attributed to the signature requesting service module 731 and/or the identification service module 732 may be otherwise implemented. For example, in some implementations, the computing device 201 may implement a web browser that is operable to access functionality performed by the signature requesting service device 202, the identification service device 203, and/or other devices. Various configurations are possible and contemplated without departing form the scope of the present disclosure.

In some examples, the computing device 201 may be used to provide payment, such as where the computing device 201 is integrated into and/or functions as a payment station. For example, such a payment station may be and/or function as a fast food payment station at a fast food establishment. In such an example, the fast food payment station may be operable to communicate with the identification service device 203 to obtain and/or process payment details stored for an identity associated with a digital representation of a biometric and notarize that such payment details have been obtained and/or processed. Alternatively, the fast food payment station may process payment, such as a credit card, and the payment station may interact with the identification service device 203 to notarize that a digital representation of a biometric is associated with an authorized user of the credit card.

In other examples, the computing device 201 may be a computing device used to access the Internet. In such examples, the computing device 201 may communicate with the identification service device 203 to notarize online transactions using digital representation of biometrics. For example, the computing device 201 may communicate with the identification service device 203 to verify that an identity associated with a received digital representation of a biometric corresponds to an authorized user of a credit card used in an online transaction.

In still other examples, the computing device 201 may function to send communications, such email. In such examples, the computing device 201 may communicate with the identification service device 203 to notarize that emails came from a particular sender using a digital representation of a biometric. This may function as a signet and prevent possible identity fraud, such as where email abusers pretend to be a president of a company to convince employees to perform unauthorized actions. Such notarization may be performed automatically when emails are sent. The recipient may then use the notarizations to verify that the sender is correct. In some examples, recipient systems may be configured to automatically use the notarizations to verify senders, display error messages (such as the lack of a notarization), and so on. Various configurations are possible and contemplated without departing from the scope of the present disclosure.

FIG. 8 depicts an example attestation request 840 that may be used in the systems 100, 200 of FIGS. 1 and/or 2 and/or one or more of the methods 300-600 of FIGS. 3-6. As shown on the fourth line within the attestation request 840, the attestation request 840 may include an identifier for the digital item to be signed, a name of the person who purports to be doing the signing, and/or various other metadata regarding the attestation request, the digital item, the person, and so on. In this example, this information may be encrypted using a symmetric encryption key (such as an advanced encryption standard or AES symmetric encryption key). The symmetric encryption key may be included, as shown on the third line within the attestation request 840, and may be encrypted using a private encryption key for the signature requesting service. The attestation request may also include a public certificate for the signature requesting service, as shown on the first and second lines of the attestation request 840. This may identify the signature requesting service as well as identify a public encryption key for the signature requesting service and/or how the public encryption key can be located.

Thus, in order to decrypt the information included in the attestation request, the public certificate for the signature requesting service may be used to obtain the public encryption key for the signature requesting service. The public encryption key for the signature requesting service may be used to decrypt the symmetric encryption key. The decrypted symmetric encryption key may then be used to decrypt the encrypted information stored in the attestation request.

FIG. 9 depicts an example data structure 950 that may be used in the systems 100, 200 of FIGS. 1 and/or 2 and/or one or more of the methods 300-600 of FIGS. 3-6. As shown, the data structure 950 may function as an identity service notarization that includes at least one identity attestation message. As illustrated on the second and third lines within the data structure 950, the identity attestation message may include an attestation identifier (which may be generated by the identification service), identification information (which may be configurable), a hash of the binary attestation request payload (such as a hash of payload of the attestation request 840 of FIG. 8), and so on. The identity attestation message may be encrypted using a symmetric encryption key. The symmetric encryption key may be included in the identity service notarization, as shown on the second line within the data structure 950, and may be encrypted using a private encryption key for the identification service. The identity service notarization may also include a public certificate for the identification service, as shown on the first line of the data structure 950. This may identify the signature requesting service as well as identify a public encryption key for the identification service and/or how the public encryption key can be located. The identity service notarization may also include metadata, as shown on the sixth line of the data structure 950, such as algorithm information regarding the procedure used to generate the hash of the binary attestation request payload, one or more timestamps, and so on. As shown on the fifth line of the data structure 950, the identity service notarization may also include an unchanged copy of the associated attestation request, such as the attestation request 840 of FIG. 8.

Thus, in order to decrypt the information included in the identity service notarization, the public certificate for the identification service may be used to obtain the public encryption key for the identification service. The public encryption key for the identification service may be used to decrypt the symmetric encryption key. The decrypted symmetric encryption key may then be used to decrypt the encrypted information stored in the identity attestation message.

The identification information may include a variety of different information associated with the identity. This may include one or more names, addresses, social security numbers or other identifiers, a fidelity level of the identification, a liveness determination for one or more biometrics involved in identification, and so on. As mentioned above, the identification information may be configurable. The identification service may be operable to include different identity information based on one or more requests specified in the attestation request by the signature requesting service. The identification service may be operable to include different identity information based on input from the person being identified, such as in response to inquiries from the identification service whether or not to include such information, defaults or profile settings associated with the identity, and so on.

In various implementations, a system for digital notarization using a biometric identification service may include at least one non-transitory storage medium that stores instructions, a biometric reader device, a communication unit, and at least one processor communicably coupled to the biometric reader device and the communication unit. The at least one processor may execute the instructions to receive a payload from a signature requesting service using the communication unit, the payload identifying a digital item to validate with a signature; obtain at least one digital representation of a biometric using the biometric reader device; receive a data structure from an identification service using the communication unit, the data structure including the payload and an identity attestation generated using the at least one digital representation of the biometric, at least a portion of the data structure is encrypted using a private encryption key of the identification service; and transmit the data structure to the signature requesting service using the communication unit.

In some examples, the identity attestation may include a liveness determination related to the at least one digital representation of the biometric. In various implementations of such examples, the at least one processor may generate the liveness determination by analyzing the at least one digital representation of the biometric or least one additional digital representation of a biometric (such as a fingerprint image captured while a sequence of fingerprint images are analyzed to verify natural movement is occurring, a facial image captured while iris dilation response to changing colored lights is monitored, and so on) and transmit the liveness determination to the identification service using the communication unit along with the payload and the at least one digital representation of the biometric.

In various examples, the at least one processor may implement a signature requesting service module that performs processing to receive the payload and transmit the data structure and an identification system module that obtains the at least one digital representation of the biometric and receives the data structure. In some implementations of such examples, the signature requesting service module and the identification system module may communicate to exchange the payload and the data structure.

In some examples, the at least one processor may instruct the identification service regarding which of a set of identity information to include in the identity attestation. In various examples, the at least one processor may instruct the identification service regarding an identity fidelity level to use in generating the identity attestation.

In some implementations, a system for digital notarization using a biometric identification service may include at least one non-transitory storage medium that stores instructions, a communication unit, and at least one processor communicably coupled to the communication unit. The at least one processor may execute the instructions to receive a payload from the signature requesting service using the communication unit, the payload identifying a digital item to validate with a signature; obtain at least one digital representation of a biometric; determine a liveness of the at least one digital representation of the biometric; determine an identity using the at least one digital representation of the biometric; generate an identity attestation using the identity and the liveness; generate a data structure that includes the payload and the identity attestation; encrypt at least a portion of the data structure using an identification service private encryption key; and transmit the data structure to the signature requesting service using the communication unit.

In various examples, the at least one processor may encrypt the identity attestation in the data structure using a symmetric identity attestation encryption key, generate an encrypted version of the symmetric identity attestation encryption key using the identification service private encryption key, and include the encrypted version of the symmetric identity attestation encryption key in the data structure. In some examples, the at least one processor may generate a hash of the payload and include the hash of the payload in the identity attestation. In various examples of such implementations, the data structure may include the payload, the hash of the payload in the identity attestation, and information regarding a procedure used to generate the hash of the payload.

In some examples, the at least one processor may determine the identity according to an identity fidelity level specified in the payload. In certain examples of such implementations, the at least one processor may include the identity fidelity level in the identity attestation.

In various examples, the at least one processor may include a set of identity information in the identity attestation as specified by a person associated with the identity. In some examples, the at least one processor may determine the identity by comparing the at least one digital representation of the biometric to stored biometric data wherein the stored biometric data is associated with the identity. In certain examples, the at least one processor may determine the identity by verifying access to an account wherein the account is associated with the identity and validating that the at least one digital representation of the biometric matches biometric data stored for the identity.

In various implementations, a system for digital notarization using a biometric identification service may include at least one non-transitory storage medium that stores instructions, a communication unit, and at least one processor communicably coupled to the communication unit. The at least one processor may execute the instructions to determine to validate a digital item with a signature; generate a payload that identifies the digital item to validate; transmit the payload to an identification service using the communication unit; receive a data structure from the identification service using the communication unit, the data structure including the payload and an identity attestation generated using at least one digital representation of the biometric, at least a portion of the data structure encrypted using a private encryption key of the identification service; and store the data structure associated with the digital item in the at least one non-transitory storage medium.

In some examples, the at least one processor may use a public encryption key of the identification service to decrypt the portion of the data structure, extract the payload and the identity attestation from the data structure, and use the payload and the identity attestation to verify validation of the digital item. In various examples, the at least one processor may identify a person for the signature in the payload. In certain examples, the at least one processor may include in the payload at least one of an identity fidelity level to use in generating the identity attestation or a set of identity information to include in the identity attestation.

Figure 10:
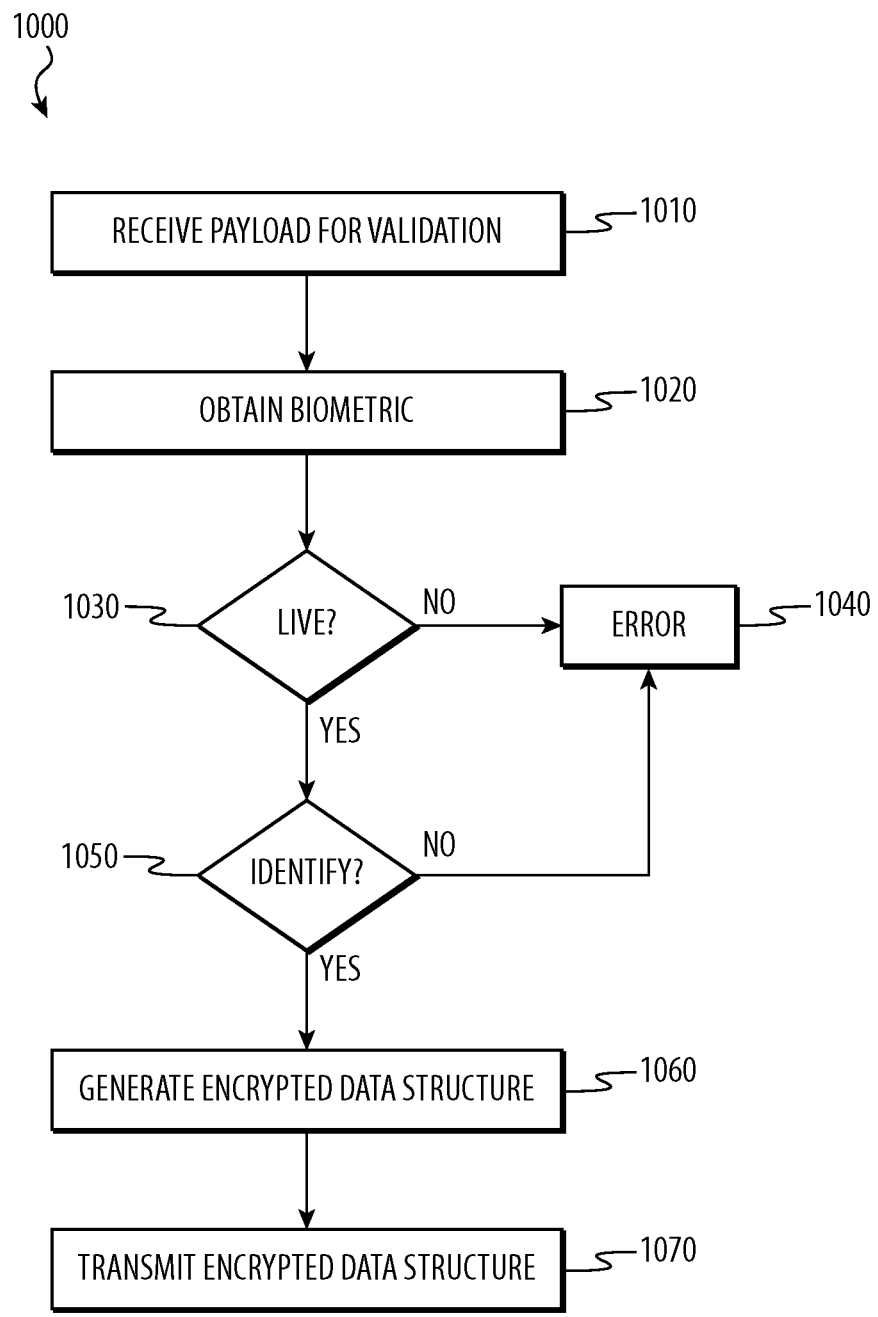
FIG. 10 depicts a flow chart illustrating a fifth example method for digital notarization using a biometric identification service. This method may be performed by the systems of FIGS. 1, 2, and/or 7.

FIG. 10 depicts a flow chart illustrating a fifth example method 1000 for digital notarization using a biometric identification service. This method 1000 may be performed by the systems 100, 200, of FIGS. 1, 2, and/or 7. For example, the method 1000 may be performed by an electronic device like the computing device 201 of FIG. 7, though it is understood that this is an example.

At operation 1010, the electronic device may receive a payload for validation of a signature. At operation 1020, the electronic device may obtain a digital representation of a biometric. The flow may then proceed to operation 1030 where the electronic device may determine a liveness of the biometric. If the biometric is live, the flow may proceed to operation 1050. Otherwise, the flow may proceed to operation 1040 where the electronic device may output an error.

The electronic device may determine liveness of a biometric in a number of different ways. For example, the electronic device may be a mobile phone with a rear facing camera that uses technology similar to that offered by Veridium®. When the rear facing camera detects the four fingers on one of a user's hand, the electronic device may activate a light emitting diode flash associated with the rear facing camera. The rear facing camera may capture an image of the fingerprints of the four fingers via the light from the light emitting diode flash reflected from the four fingers. The electronic device may also evaluate data from the rear facing camera during capture to ensure that the fingers are moving in such a way that demonstrates that the image is captured from actual present fingers of a live person as opposed to a photograph or other fake situation. In another example, a facial image may be recorded while various colored lights are emitted and iris dilation in response to the colored lights is monitored. In yet another example, a heart rhythm or other biological information may be monitored during biometric collection to ensure that a live person is providing the biometric.

In other examples, other mechanisms may be used to detect liveness of a biometric. For example, temperature sensors, conductivity sensors, and/or other sensors may be included with a fingerprint scanner. Such sensors may be used to detect the presence of a live finger during capture of a fingerprint. In still other examples, a camera may monitor capture of the biometric and images from the camera may be analyzed to ensure that the biometric was provided by a living person without any fraud (such as use of a first camera to ensure that a person scanning his face with a second camera does not hold the second camera up to another person, to a picture, and so on).

At operation 1050, after it is determined that the biometric is live, the electronic device may determine whether or not an identity of a person can be determined using the digital representation of the biometric. If so, the flow may proceed to operation 1060. Otherwise, the flow may proceed to operation 1040 where the electronic device may output an error.

At operation 1060, after the electronic device determines the identity, the electronic device may generate an encrypted data structure using the identity and the payload. The flow may then proceed to operation 1070 where the electronic device may transmit the encrypted data structure. For example, the electronic device may transmit the encrypted data structure to a device from which the electronic device received the payload. In some examples, the electronic device may transmit the encrypted data structure to the device via an intermediate device.

Although the example method 1000 is illustrated and described as including particular operations performed in a particular order, it is understood that this is an example. In various implementations, various orders of the same, similar, and/or different operations may be performed without departing from the scope of the present disclosure.

For example, the method 1000 illustrates and describes using the digital representation of the biometric to determine the identity. However, it is understood that this is an example. In some implementations, the electronic device may determine the identity using a login to an account associated with the identity. However, login to the account may not have a sufficient fidelity level for identification as specified in the payload. In such an example, the digital representation of the biometric may be matched against biometric data associated with the identity in order to increase the fidelity level of the identification. This may allow use of certain kinds of biometrics, such as facial image, to confirm determined identity whereas such biometrics may be less reliable and/or too computationally intensive for pure identification comparing against all stored biometric data rather than a specific set associated with a specific identity.

By way of another example, a person may provide a name and/or other information associated with an identity rather than and/or in addition to providing a login to an account. Such a name and/or other information that would be known to someone corresponding to the identity may be used to perform an initial identification that may then be supplemented by matching a digital representation of a biometric obtained from the person to stored biometric data associated with the identity to increase the fidelity level of the identification. Various configurations are possible and contemplated without departing from the scope of the present disclosure.

In various examples, this example method 1000 may be implemented as a group of interrelated software modules or components that perform various functions discussed herein. These software modules or components may be executed within a cloud network and/or by one or more computing devices, such as the computing device 201, the signature requesting service device 202, and/or the identification service device 203 of FIG. 2.

Figure 11:
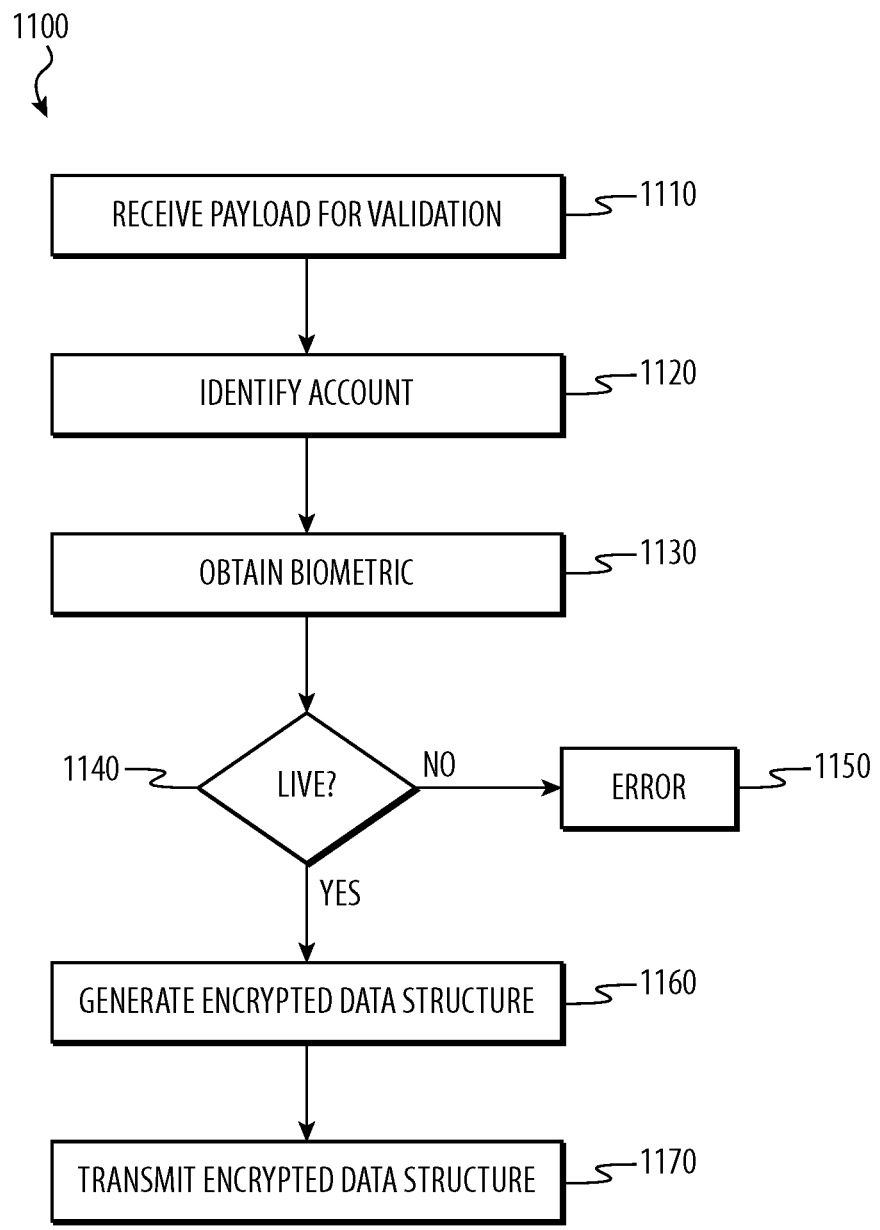
FIG. 11 depicts a flow chart illustrating a sixth example method for digital notarization using a biometric identification service. This method may be performed by the systems of FIGS. 1, 2, and/or 7.

FIG. 11 depicts a flow chart illustrating a sixth example method 1100 for digital notarization using a biometric identification service. This method 1100 may be performed by the systems 100, 200, of FIGS. 1, 2, and/or 7. For example, the method 1100 may be performed by an electronic device like the computing device 201 of FIG. 7, though it is understood that this is an example.

At operation 1110, the electronic device receives a payload for validation. At operation 1120, the electronic device identifies an account associated with an identity. For example, the electronic device may identify the account based on a previous and/or current account login.

The flow then may proceed to operation 1130 where the electronic device may obtain a biometric. The digital representation of the biometric may be matched against biometric data associated with the account to confirm the account and digital representation of the biometric. Next the flow may proceed to operation 1140 where the electronic device determines whether or not the biometric used to confirm the identity associated with the account is live. If so, the flow may proceed to operation 1160. Otherwise the flow may proceed to operation 1150 where the electronic device may output an error.

At operation 1160, after the electronic device determines the biometric used to confirm the identity associated with the account is live, the electronic device may generate an encrypted data structure. The flow may then proceed to operation 1170 where the electronic device may transmit the encrypted data structure.

Although the example method 1100 is illustrated and described as including particular operations performed in a particular order, it is understood that this is an example. In various implementations, various orders of the same, similar, and/or different operations may be performed without departing from the scope of the present disclosure.

For example, in some implementations, the electronic device may determine at operation 1120 that an account associated with an identity cannot be identified. If so, the flow may proceed to operation 1150 and the electronic device may output an error.

In various examples, this example method 1100 may be implemented as a group of interrelated software modules or components that perform various functions discussed herein. These software modules or components may be executed within a cloud network and/or by one or more computing devices, such as the computing device 201, the signature requesting service device 202, and/or the identification service device 203 of FIG. 2.

Figure 12:
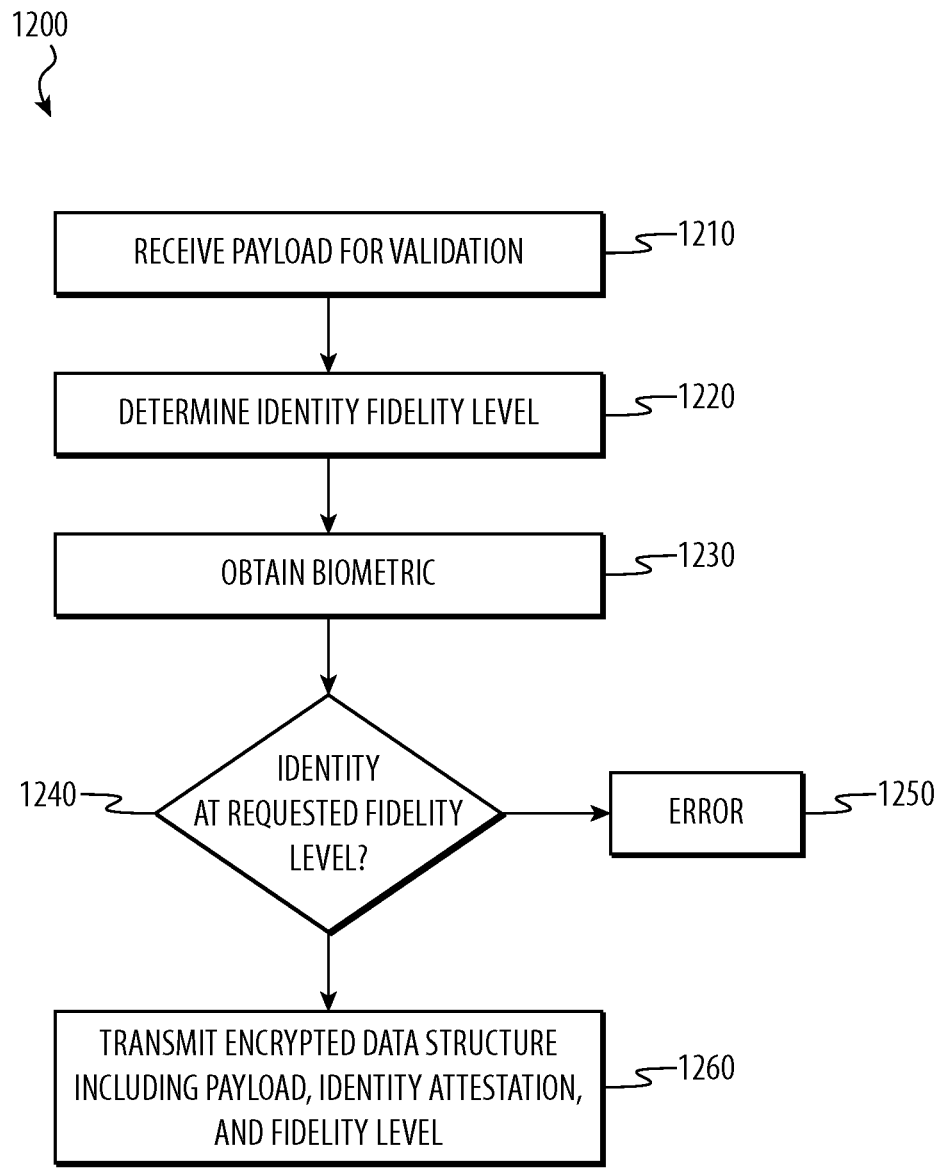
FIG. 12 depicts a flow chart illustrating a seventh example method for digital notarization using a biometric identification service. This method may be performed by the systems of FIGS. 1, 2, and/or 7.

FIG. 12 depicts a flow chart illustrating a seventh example method 1200 for digital notarization using a biometric identification service. This method 1200 may be performed by the systems 100, 200, of FIGS. 1, 2, and/or 7. For example, the method 1200 may be performed by an electronic device like the computing device 201 of FIG. 7, though it is understood that this is an example.

At operation 1210, the electronic device may receive a payload for validation. At operation 1220, the electronic device may determine an identity fidelity level to use for the payload (such as 80% certain or 90% certain, identification only, identification and liveness of biometrics used in identification, and so on). For example, the payload may specify the identity fidelity level. By way of another example, the identity fidelity level may be specified in settings associated with the identity and/or based on user input. In yet another example, the electronic device may use different identity fidelity levels for different payload requestors. By way of another example, the electronic device may determine an identity fidelity level based on a payload type (such as where a higher fidelity level is used for validating real estate transactions than validating checkout of oa library book). Various configurations are possible and contemplated without departing from the scope of the present disclosure.

The flow may proceed to operation 1230 where the electronic device may obtain a digital representation of at least one biometric. Next, the flow may proceed to operation 1240 where the electronic device may determine whether or not identity can be determined at the determined identity fidelity level. The identity determination may use the digital representation of the biometric. If identity cannot be determined at the determined identity fidelity level, the flow may proceed to operation 1250 where the electronic device may output an error. Otherwise, the flow may proceed to operation 1260.

At operation 1260, after the electronic device determines that identity can be determined at the determined identity fidelity level, the electronic device may transmit an associated encrypted data structure. The encrypted data structure may include the payload, one or more identity attestations, the fidelity level, and so on.

Although the example method 1200 is illustrated and described as including particular operations performed in a particular order, it is understood that this is an example. In various implementations, various orders of the same, similar, and/or different operations may be performed without departing from the scope of the present disclosure.

For example, the method 1200 is illustrated and described as determining whether or not identity can be determined at the determined identity fidelity level after the digital representation of the biometric is obtained. However, in some implementations, the electronic device may be able to determine that identity cannot be determined at the determined identity fidelity level prior to obtaining the digital representation of the biometric. In such an example, the operation of obtaining the digital representation of the biometric may be omitted. In other examples, the electronic device may dynamically change the type and/or number of digital representations of biometrics collected and/or evaluated in order to meet the determined identity level. Various configurations are possible and contemplated without departing from the scope of the present disclosure.

In various examples, this example method 1200 may be implemented as a group of interrelated software modules or components that perform various functions discussed herein. These software modules or components may be executed within a cloud network and/or by one or more computing devices, such as the computing device 201, the signature requesting service device 202, and/or the identification service device 203 of FIG. 2.

Figure 13:
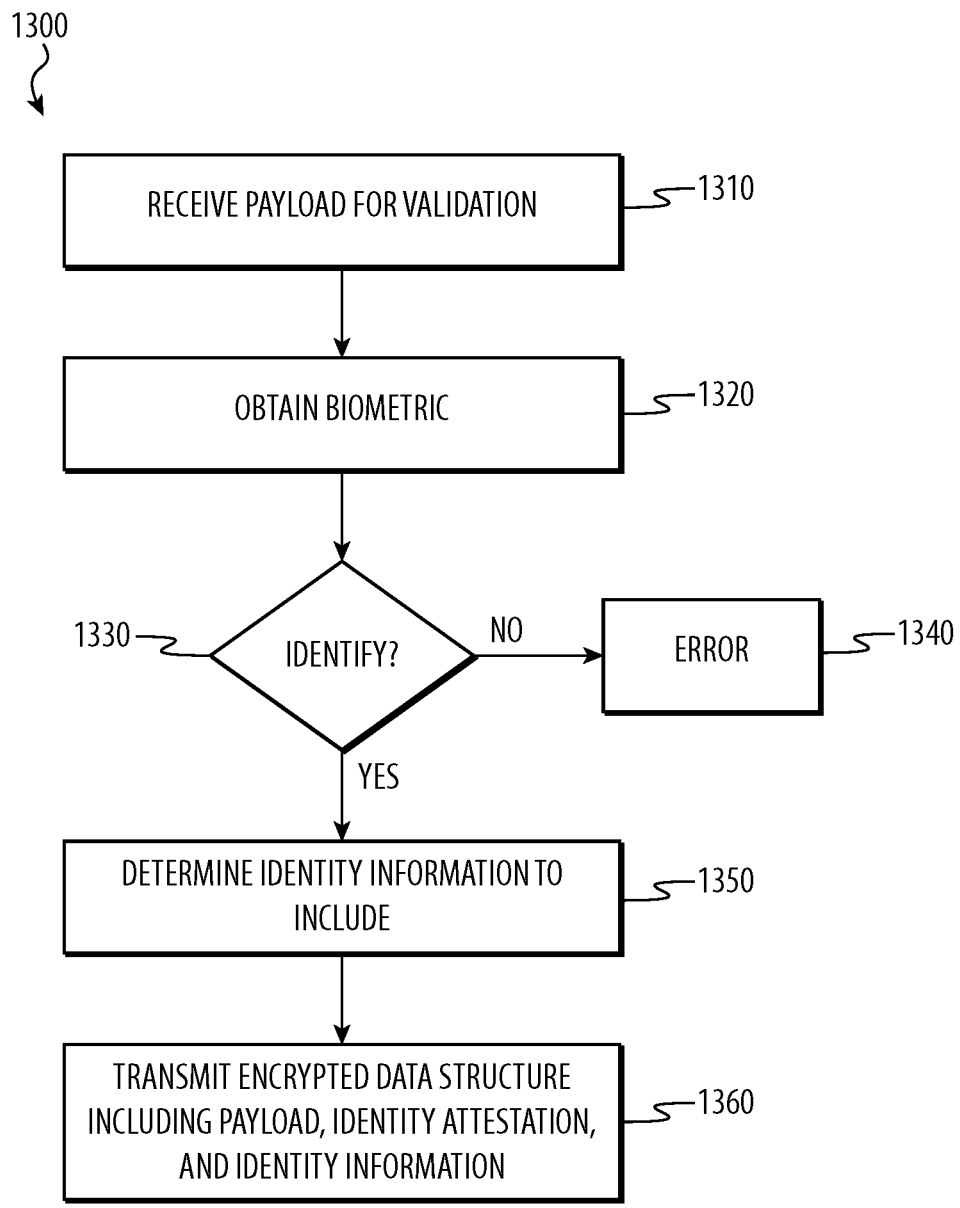
FIG. 13 depicts a flow chart illustrating an eighth example method for digital notarization using a biometric identification service. This method may be performed by the systems of FIGS. 1, 2, and/or 7.

FIG. 13 depicts a flow chart illustrating an eighth example method 1300 for digital notarization using a biometric identification service. This method 1300 may be performed by the systems 100, 200, of FIGS. 1, 2, and/or 7. For example, the method 1300 may be performed by an electronic device like the computing device 201 of FIG. 7, though it is understood that this is an example.

At operation 1310, the electronic device may receive a payload for validation. At operation 1320, the electronic device may obtain a digital representation of a biometric. At operation 1330, the electronic device may determine whether or not an identity can be determined, which may use the digital representation of the biometric. If not, the flow may proceed to operation 1340 where the electronic device may output an error. Otherwise, the flow may proceed to operation 1350.

At operation 1350, after the electronic device determines that an identity can be determined, the electronic device may determine identity information to include in an encrypted data structure. The electronic device may determine to include a variety of different information associated with the identity. This may include one or more names, addresses, social security numbers or other identifiers, a fidelity level of the identification, a liveness determination for one or more biometrics involved in identification, and so on. The electronic device may determine to include different identity information based on one or more requests specified in the payload. The electronic device may determine to include different identity information based on input from the person being identified, such as in response to inquiries from the electronic device whether or not to include such information, defaults or profile settings associated with the identity, and so on.

Next, the flow may proceed to operation 1360 where the electronic device may transmit an associated encrypted data structure. The encrypted data structure may include the payload, one or more identity attestations, the determined identity information, and so on.

Although the example method 1300 is illustrated and described as including particular operations performed in a particular order, it is understood that this is an example. In various implementations, various orders of the same, similar, and/or different operations may be performed without departing from the scope of the present disclosure.

For example, operations 1330-1350 illustrate and describe determining the identity before determining the identity information to include. However, it is understood that this is an example. In some implementations, a user may provide input regarding the identity information that may be included. In such an implementation, this input may be evaluated to determine the identity information to include prior to determining an identity for the user. Various configurations are possible and contemplated without departing from the scope of the present disclosure.

In various examples, this example method 1300 may be implemented as a group of interrelated software modules or components that perform various functions discussed herein. These software modules or components may be executed within a cloud network and/or by one or more computing devices, such as the computing device 201, the signature requesting service device 202, and/or the identification service device 203 of FIG. 2.

Figure 14:
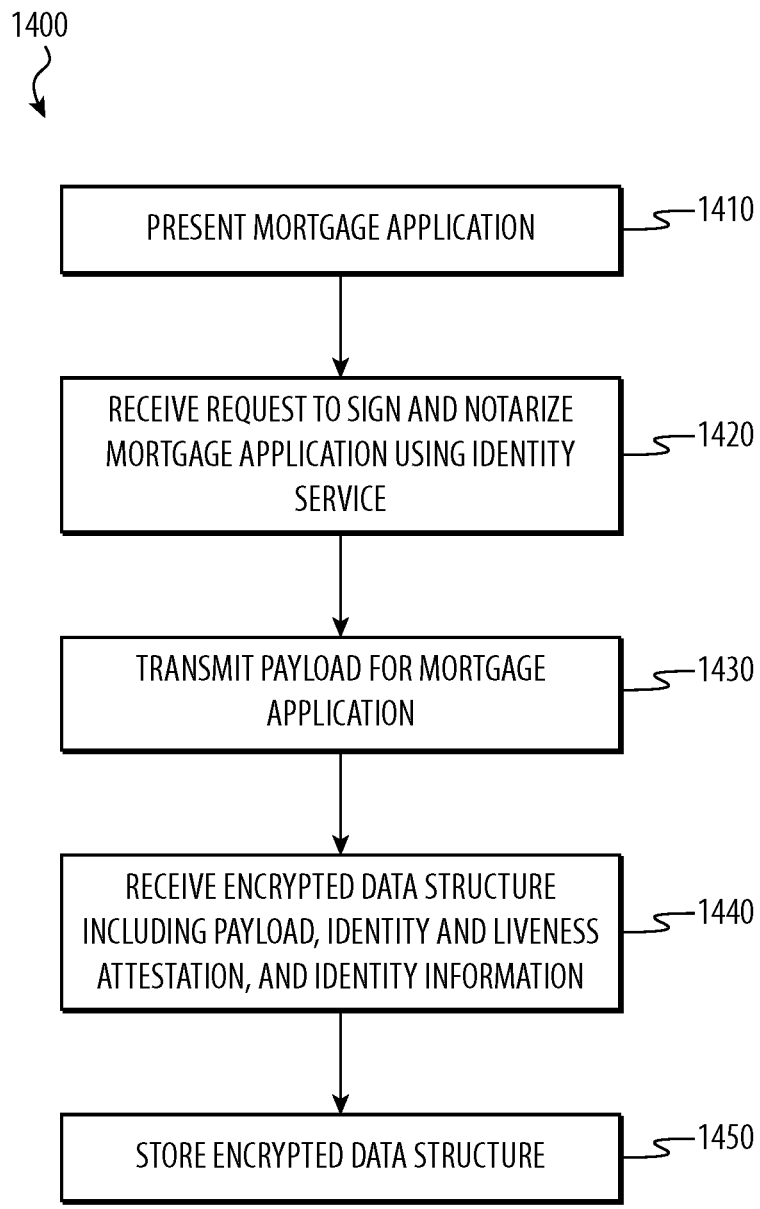
FIG. 14 depicts a flow chart illustrating a ninth example method for digital notarization using a biometric identification service. This method may be performed by the systems of FIGS. 1, 2, and/or 7.

FIG. 14 depicts a flow chart illustrating a ninth example method 1400 for digital notarization using a biometric identification service. This method 1400 may be performed by the systems 100, 200, of FIGS. 1, 2, and/or 7. For example, the method 1400 may be performed by an electronic device like the signature requesting service device 202 of FIG. 2, though it is understood that this is an example.

At operation 1410, the electronic device may present an electronic mortgage application. At operation 1420, the electronic device may receive a request to sign and notarize the electronic mortgage application using an identity service. At operation 1430, the electronic device may transmit a payload for signing and notarizing the electronic mortgage application. The electronic device may transmit the payload to the identification service. In some examples, the electronic device may transmit the payload to the identification service via an intermediate device.

At operation 1440, the electronic device may receive an encrypted data structure. The encrypted data structure may include a payload, identity and liveness attestations, and identity information. The electronic device may receive the encrypted data structure in response to transmitting the payload. At operation 1450, the electronic device may store the encrypted data structure.

Although the example method 1400 is illustrated and described as including particular operations performed in a particular order, it is understood that this is an example. In various implementations, various orders of the same, similar, and/or different operations may be performed without departing from the scope of the present disclosure.

For example, the method 1400 is illustrated and described as signing and notarizing an electronic mortgage application. However, it is understood that this is an example. In various implementations, any digital item may be signed and notarized without departing from the scope of the present disclosure.

In various examples, this example method 1400 may be implemented as a group of interrelated software modules or components that perform various functions discussed herein. These software modules or components may be executed within a cloud network and/or by one or more computing devices, such as the computing device 201, the signature requesting service device 202, and/or the identification service device 203 of FIG. 2.

Figure 15:
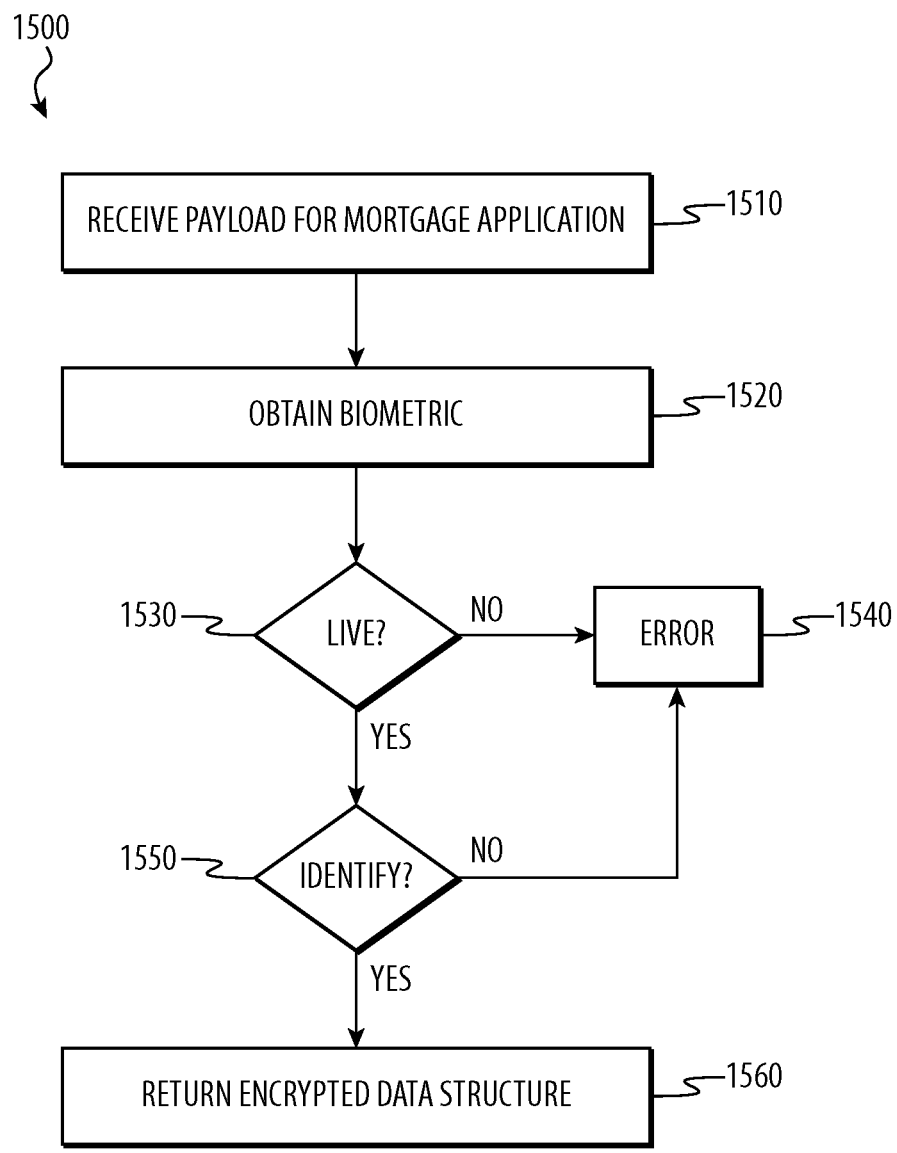
FIG. 15 depicts a flow chart illustrating a tenth example method for digital notarization using a biometric identification service. This method may be performed by the systems of FIGS. 1, 2, and/or 7.

FIG. 15 depicts a flow chart illustrating a tenth example method 1500 for digital notarization using a biometric identification service. This method 1500 may be performed by the systems 100, 200, of FIGS. 1, 2, and/or 7. For example, the method 1500 may be performed by an electronic device like the identification service device 203 of FIG. 2, though it is understood that this is an example.

At operation 1510, the electronic device may receive a payload for signing and notarizing an electronic mortgage application. The flow may proceed to operation 1520 where the electronic device may obtain one or more digital representations of biometrics. Next, the flow may proceed to operation 1530.

At operation 1530, the electronic device may determine whether or not the biometric is live. If not, the flow may proceed to operation 1540 and the electronic device may output an error. Otherwise, the flow may proceed to operation 1550.

At operation 1550, the electronic device may determine whether or not an identity associated with the digital representation of the biometric can be identified. If not, the flow may proceed to operation 1540 and the electronic device may output an error. Otherwise, the flow may proceed to operation 1560.

At operation 1560, after the electronic device determines an identity associated with the digital representation of the biometric, the electronic device may return an encrypted data structure. The encrypted data structure may be generated using the identity and the payload for signing and notarizing the electronic mortgage application.

Although the example method 1500 is illustrated and described as including particular operations performed in a particular order, it is understood that this is an example. In various implementations, various orders of the same, similar, and/or different operations may be performed without departing from the scope of the present disclosure.

For example, the method 1500 is illustrated and described as providing an encrypted data structure to sign and notarize an electronic mortgage application. However, it is understood that this is an example. In various implementations, an encrypted data structure may be provided to sign and notarize any digital item without departing from the scope of the present disclosure.

In various examples, this example method 1500 may be implemented as a group of interrelated software modules or components that perform various functions discussed herein. These software modules or components may be executed within a cloud network and/or by one or more computing devices, such as the computing device 201, the signature requesting service device 202, and/or the identification service device 203 of FIG. 2.

In various implementations, the signing and notarization discussed herein with respect to encrypted data structures may be used in blockchain networks. The encrypted data structures may be particularly useful in the public ledger context of such a network, particularly in implementations where any node can join the blockchain network, as the encrypted data structures may be self-proving and self-authenticating.

Figure 16:
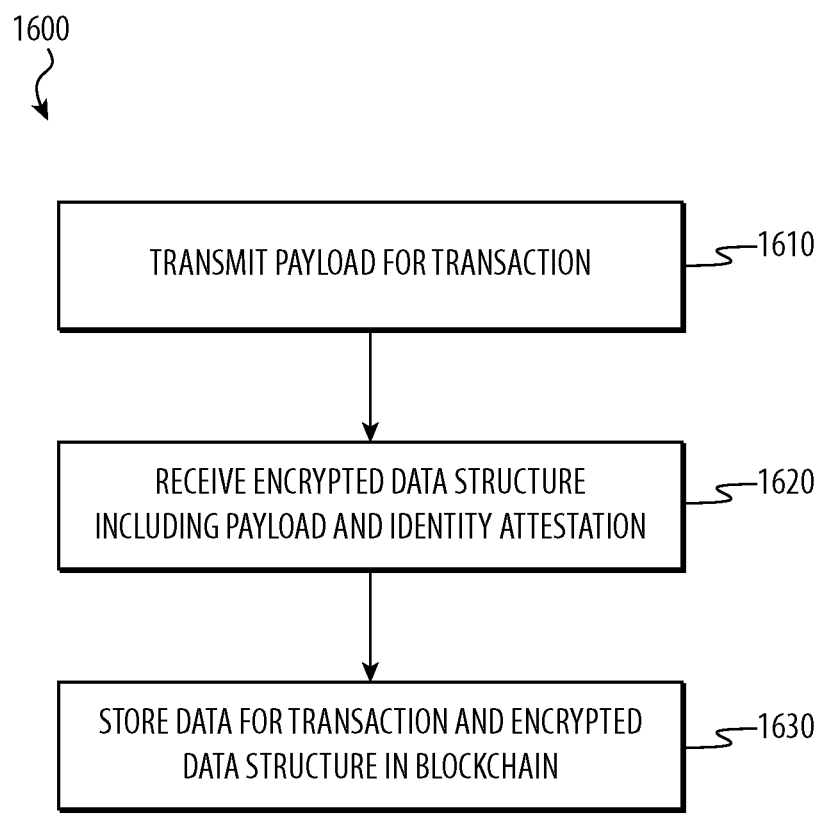
FIG. 16 depicts a flow chart illustrating an eleventh example method for digital notarization using a biometric identification service. This method may be performed by the systems of FIGS. 1, 2, and/or 7.

For example, FIG. 16 depicts a flow chart illustrating an eleventh example method 1600 for digital notarization using a biometric identification service. This method 1600 may be performed by the systems 100, 200, of FIGS. 1, 2, and/or 7.

For example, the method 1600 may be performed by an electronic device acting as a blockchain network node like the signature requesting service device 202 of FIG. 2, though it is understood that this is an example.

At operation 1610, the electronic device transmits a payload for signing and notarizing a transaction in a blockchain network. The flow may then proceed to operation 1620 where the electronic device receives an encrypted data structure for the transaction including the payload and at least one identity attestation. Next, the flow may proceed to operation 1630 where the electronic device may store data for the transaction and the encrypted data structure in the blockchain.

Although the example method 1600 is illustrated and described as including particular operations performed in a particular order, it is understood that this is an example. In various implementations, various orders of the same, similar, and/or different operations may be performed without departing from the scope of the present disclosure.

For example, the method 1600 assumes that the encrypted data structure is received. However, in some examples, an encrypted data structure may not be received when a payload is transmitted. In some implementations of such an example, the electronic device may respond to failure to receive the encrypted data structure by refusing the transaction. In other implementations, the electronic device may note that the encrypted data structure was not received. Various configurations are possible and contemplated without departing from the scope of the present disclosure.

In various examples, this example method 1600 may be implemented as a group of interrelated software modules or components that perform various functions discussed herein. These software modules or components may be executed within a cloud network and/or by one or more computing devices, such as the computing device 201, the signature requesting service device 202, and/or the identification service device 203 of FIG. 2.

Returning to FIG. 2, in various implementations, the system 200 may be used for validating pharmaceutical transactions. For example, people may purchase pharmaceutical products from abroad. Some such purchases may legally require a prescription from a doctor. As such, pharmaceutical sale companies abroad may desire or require proof of such a prescription to complete a sale and/or before shipping. Alternatively and/or additionally, shippers and/or customs and/or border agents may desire or require proof of such a prescription prior to taking such products and/or allowing such products across a border.

By way of illustration, the signature requesting service device 202 may be part of a prescription verification system and may generate a payload for a prescription to be validated by a doctor. The payload may include information identifying the prescription, the person for whom the prescription is generated, the seller of a product related to the prescription, the doctor, and/or any other information related to the prescription. The identification service device 203 may receive the payload (such as from the signature requesting system device 202, the computing device 202 operated by the doctor, another computing device operated by the person for whom the prescription is generated, and so on). The identification service device 203 may receive at least one digital representation of a biometric and/or other identification information that may be used to determine an identity associated with the doctor from the computing device 201 (such as transmitting a request to the computing device 201, receiving a request unsolicited form the computing device 201, and so on). The identification service device 203 may determine the identity associated with the doctor using the at least one digital representation of a biometric and/or other identification information and generate a data structure. The data structure may include the payload and/or one or more attestations (such as a name of the doctor, an authorization and/or registration number for the doctor that allows the doctor to issue the prescription, payment and/or insurance benefit information for the prescription, and so on). The identification service device 203 may encrypt at least a portion of the data structure using a private key of the identification service and then provide the data structure (such as to the signature requesting service device 202, the computing device 201, the person for whom the prescription is generated, and so on).

The data structure may then be used to verify that the prescription is valid. In various implementations, the data structure may be included with a record of a purchase related to the prescription, provided to a seller in order to authorize the purchase, provided to a shipper to authorize transport of the purchase, provided to a customs and/or border agent to establish authorization for allowing the purchase across a border, provided to the person for whom the prescription is generated to prove authorization to possess the purchase after receipt and/or claim the purchase, and so on.

Although the above describes a particular sequence of interactions between devices and/or entities, it is understood that this is an example. Various configurations are possible and contemplated without departing from the scope of the present disclosure. For example, in various implementations, such a process may be initiated by a doctor entering a prescription for a person, by a person initiating a prescription product purchase, by the seller of a prescription, by an insurance company providing prescription product benefits, and so on.

In another example, such data structures may be used in the context of an insurance/pharmacy infrastructure. The pharmacy may receive the data structures to validate medication sales. An insurance provider may provide payment to the pharmacy for medications sold, but may request verification of sales. The pharmacy may provide the data structures and/or aggregated information about the data structures to verify that the sales occurred. In some examples, the insurance provider may decrypt and/or analyze various portions of the data structures (whether utilizing an associated identification service device 203 or otherwise) to verify data regarding the sales, such as the medications, the names of purchasers, insurance information, prescribing doctor, and so on.

In some implementations, the system 200 may be used to validate payments in electronic transactions. For example, the signature requesting device 202 may be operated by an electronic transaction service, such as an online retailer. The electronic transaction service may have received payment details for a transaction, such as a credit card number and/or expiration date, three digit authorization code, billing name, billing address, and so on. The signature requesting service device 202 may generate a payload to validate the payment details. The payload may include information identifying the payment details (such as a credit card number and/or expiration date, three digit authorization code, billing name, billing address, and so on), the transaction, the person associated with authorizing the payment with the payment details, the electronic transaction service, and so on. The identification service device 203 may receive the payload (such as from the signature requesting system device 202, the computing device 202 operated by the payee, and so on). The identification service device 203 may receive at least one digital representation of a biometric and/or other identification information that may be used to determine an identity associated with the person associated with authorizing the payment with the payment details from the computing device 201 (such as transmitting a request to the computing device 201, receiving a request unsolicited form the computing device 201, and so on). The identification service device 203 may determine the identity associated with the payment details using the at least one digital representation of a biometric and/or other identification information and generate a data structure. The data structure may include the payload and/or one or more attestations (such as a name of the person associated with authorizing the payment with the payment details, an authorization for payment, the results of various checks that the person associated with authorizing the payment with the payment details authorized the payment details, and so on). The identification service device 203 may encrypt at least a portion of the data structure using a private key of the identification service and then provide the data structure (such as to the signature requesting service device 202, the computing device 201, the payee, and so on). The data structure may then be provided to the electronic transaction service to validate the transaction and/or that use of the payment details was authorized.

The attestations may include multi-factor authentication of the use of the payment details. For example, the attestations may include a verification of the payment details and/or other confirming information known to a person authorized to use the payment details (such as passwords, social security numbers, billing addresses, mother's maiden name, security questions, and so on). This is a "something you know" type of authentication. The attestations may also include a verification of the digital representation of the biometric, which is a "something you are" or "something you have" type of authentication. In some implementations, the attestations may include a verification that a message was transmitted to the computing device 201 (which may be a mobile phone or other device registered as in the possession of the person authorized to use the payment details) and acknowledged confirming authorized use of the payment details, which is another example of a "something you have" type of authentication. In other implementations, the attestations may include a verification that a token, code, or other verification issued by an authorization device (such as a security fob that outputs verification codes, a universal serial bus security token issuing device, and so on) known to be in the possession of the person authorized to use the payment details, which is another example of a "something you have" type of authentication. Various configurations are possible and contemplated without departing from the scope of the present disclosure. Regardless, various multi-factor authentication verifications may be included in the attestations such that the data structure may verify to various high degrees of reliability that use of the payment details for the transaction was validated by the person authorized to use the payment details.

In some implementations, the payment details may be included in the payload and used by the identity service device 203 for determining authorization in generating the data structure. In other implementations, the payment details may be associated with the identity and thus accessible to the identity service device 203 without the payload. In such an implementation, the payment details may be omitted from the payload and/or included in an abbreviated, hashed, and/or otherwise encrypted and/or obscured form. In examples where the payload include an abbreviated, hashed, and/or otherwise encrypted and/or obscured form of the payment details, the identity service device 203 may compare such an abbreviated, hashed, and/or otherwise encrypted and/or obscured form payment details against payment details associated with the identity to verify that payload is for payment details associated with the identity. Various configurations are possible and contemplated without departing from the scope of the present disclosure.

As described above and illustrated in the accompanying figures, the present disclosure relates to digital notarization using a biometric identification service. A signature requesting service may receive a request to validate a digital item with a signature for a person. The signature requesting service may provide a payload that identifies the digital item and/or the person to an identity service. The identity service may obtain one or more digital representations of biometrics for the person, determine an identity for the person, and return a data structure including the payload and one or more identity attestations regarding the determined identity. The identity service encrypts at least a portion of the data structure using a private encryption key. A public encryption key for the identity service can then be used to decrypt the portion to verify that the data structure was generated by the identity service after determining the identity. In this way, the validation can be verified to the full trust level of the identification service.

The present disclosure recognizes that biometric and/or other personal data is owned by the person from whom such biometric and/or other personal data is derived. This data can be used to the benefit of those people. For example, biometric data may be used to conveniently and reliably identify and/or authenticate the identity of people, access securely stored financial and/or other information associated with the biometric data, and so on. This may allow people to avoid repeatedly providing physical identification and/or other information.

The present disclosure further recognizes that the entities who collect, analyze, store, and/or otherwise use such biometric and and/or other personal data should comply with well-established privacy policies and/or privacy practices. Particularly, such entities should implement and consistently use privacy policies and practices that are generally recognized as meeting or exceeding industry or governmental requirements for maintaining security and privately maintaining biometric and/or other personal data, including the use of encryption and security methods that meets or exceeds industry or government standards. For example, biometric and/or other personal data should be collected for legitimate and reasonable uses and not shared or sold outside of those legitimate uses. Further, such collection should occur only after receiving the informed consent. Additionally, such entities should take any needed steps for safeguarding and securing access to such biometric and/or other personal data and ensuring that others with access to the biometric and/or other personal data adhere to the same privacy policies and practices. Further, such entities should certify their adherence to widely accepted privacy policies and practices by subjecting themselves to appropriate third party evaluation.

Additionally, the present disclosure recognizes that people may block the use of, storage of, and/or access to biometric and/or other personal data. Entities who typically collect, analyze, store, and/or otherwise use such biometric and/or other personal data should implement and consistently prevent any collection, analysis, storage, and/or other use of any biometric and/or other personal data blocked by the person from whom such biometric and/or other personal data is derived.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A system, comprising:
   at least one non-transitory storage medium that stores instructions; and
   at least one processor that executes the instructions to:
   receive a payload that identifies a digital item to validate with a signature;
   determine a set of identity information to include in an identity attestation;
   transmit the payload, at least one digital representation of a biometric, and information regarding the set of identity information;
   receive a data structure in response to transmitting the payload and the at least one digital representation of the biometric, the data structure including a copy of the payload and the identity attestation generated using the at least one digital representation of the biometric, at least a portion of the data structure encrypted using a private encryption key to form an encrypted portion, the encrypted portion including at least a portion of the copy of the payload;
   transmit the data structure; and
   decrypt the encrypted portion.

2. The system of claim 1, wherein the at least one processor determines the set of identity information to include in the identity attestation based on a specification from a person associated with the signature.

3. The system of claim 1, wherein the set of identity information includes at least one of:
   a name;
   an identifier that is usable to determine the name;
   an address;
   a social security number;
   financial information;
   an authorization number; or
   a registration number.

4. The system of claim 1, wherein the at least one processor determines the set of identity information to include in the identity attestation based on a specification in an attestation request.

5. The system of claim 4, wherein the at least one processor receives the payload with the attestation request.

6. The system of claim 1, wherein the at least one processor determines an identity fidelity level to use in generating the identity attestation.

7. The system of claim 6, wherein the at least one processor determines the identity fidelity level to use in generating the identity attestation using a specification received in association with the payload.

8. A system, comprising:
   at least one non-transitory storage medium that stores instructions; and
   at least one processor that executes the instructions to:
   receive a payload that identifies a digital item to validate with a signature;
   generate an identity attestation determined using an identity determined using at least one digital representation of a biometric;
   generate a data structure that includes a copy of the payload and the identity attestation;
   encrypt at least a portion of the data structure using a private encryption key to form an encrypted portion, the encrypted portion including at least a portion of the copy of the payload; and
   transmit the data structure.

9. The system of claim 8, wherein the encrypted portion is separate from the payload.

10. The system of claim 8, wherein the at least one processor includes a hash of the payload in the encrypted portion.

11. The system of claim 10, wherein the data structure includes information regarding a procedure used to generate the hash of the payload.

12. The system of claim 8, wherein the at least one processor is operable to:
    decrypt the encrypted portion of the data structure; and
    provide the at least the portion of the copy of the payload extracted from the encrypted portion.

13. The system of claim 8, wherein the at least one processor determines liveness of the at least one digital representation of the biometric.

14. The system of claim 8, wherein the at least one processor is operable to perform a verification by comparing at least part of the payload to at least part of the encrypted portion.

15. The system of claim 8, wherein the payload comprises a document.

16. The system of claim 8, wherein the payload comprises an email.

17. A system, comprising:
    at least one non-transitory storage medium that stores instructions; and at least one processor that executes the instructions to:
  determine to validate a digital item with a signature;
  generate a payload that identifies the digital item to validate;
  transmit the payload;
  receive a data structure that includes a copy of the payload and an identity attestation generated using at least one digital representation of a biometric, at least a portion of the data structure encrypted using a private encryption key to form an encrypted portion, the encrypted portion including at least a portion of the copy of the payload; and
  store the data structure.

18. The system of claim 17, wherein the at least one processor transmits a specification of identity information to include in the identity attestation included in the data structure.

19. The system of claim 18, wherein the at least one processor transmits the specification with the payload.

20. The system of claim 17, wherein the encrypted portion includes at least a portion of the at least one digital representation of the biometric.

* * * * *